(12) United States Patent
Naitou et al.

(10) Patent No.: US 7,592,733 B2
(45) Date of Patent: Sep. 22, 2009

(54) ROTARY ELECTRIC MACHINE AND ELECTRIC WHEELCHAIR MOUNTED WITH ROTARY ELECTRIC MACHINE

(75) Inventors: Shinya Naitou, Shizuoka-ken (JP); Haruyoshi Hino, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 403 days.

(21) Appl. No.: 11/489,699

(22) Filed: Jul. 19, 2006

(65) Prior Publication Data

US 2007/0018529 A1    Jan. 25, 2007

(30) Foreign Application Priority Data

Jul. 20, 2005 (JP) .............................. 2005-210496

(51) Int. Cl.
*H02K 1/14* (2006.01)
*H02K 21/24* (2006.01)
*H02K 1/18* (2006.01)

(52) U.S. Cl. .................. 310/254; 310/156.33; 310/218; 310/268; 180/65.1; 180/65.5

(58) Field of Classification Search ................................ 310/156.32–156.35, 268, 216–218; 180/65.1, 180/65.5
See application file for complete search history.

(56) References Cited

U.S. PATENT DOCUMENTS

| 4,551,645 | A |   | 11/1985 | Takahashi et al. |         |
|-----------|---|---|---------|------------------|---------|
| 4,719,377 | A | * | 1/1988  | Horie et al.     | 310/44  |
| 4,998,032 | A |   | 3/1991  | Burgbacher       |         |
| 5,047,682 | A | * | 9/1991  | Burgbacher       | 310/361 |
| 5,142,178 | A | * | 8/1992  | Kloster et al.   | 310/217 |
| 5,234,066 | A |   | 8/1993  | Ahsing et al.    |         |
| 5,489,811 | A |   | 2/1996  | Kern et al.      |         |
| RE35,763  | E |   | 4/1998  | Burgbacher       |         |
| 5,818,189 | A | * | 10/1998 | Uchiyama et al.  | 318/488 |
| 6,157,112 | A |   | 12/2000 | Suzuki           |         |
| 6,278,217 | B1|   | 8/2001  | Kliman et al.    |         |
| 6,407,472 | B1|   | 6/2002  | Takayanagi       |         |
| 6,445,105 | B1| * | 9/2002  | Kliman et al.    | 310/268 |

(Continued)

FOREIGN PATENT DOCUMENTS

CN    1627596    6/2005

(Continued)

OTHER PUBLICATIONS

European Search Report, Application No. EP 06 01 5069, Mar. 22, 2007.

(Continued)

*Primary Examiner*—Burton Mullins
(74) *Attorney, Agent, or Firm*—Knobbe, Martens, Olson & Bear, LLP

(57) ABSTRACT

A rotary electric machine includes a stator including a plurality of teeth which are each wound up by a coil and a stator yoke core connecting the respective teeth, and a rotor provided with magnets disposed so as to oppose to the teeth, respectively, with a space therebetween. Each of the teeth has a surface opposing to the magnet of the rotor, and the opposing surface is formed with a protruded portion at substantially central portion thereof in the circumferential direction of the stator.

13 Claims, 22 Drawing Sheets

U.S. PATENT DOCUMENTS

| | | |
|---|---|---|
| 6,472,783 B1 | 10/2002 | Witthohn et al. |
| 6,717,324 B2 * | 4/2004 | Chen .................. 310/268 |
| 6,809,453 B2 * | 10/2004 | Narita et al. ............ 310/216 |
| 6,847,149 B2 * | 1/2005 | De Filippis ............ 310/216 |
| 6,888,283 B2 * | 5/2005 | Yonekura ............... 310/216 |
| 7,173,357 B2 | 2/2007 | Naito et al. |
| 7,262,540 B2 | 8/2007 | Lee |
| 7,271,519 B2 | 9/2007 | Lee |
| 2003/0057796 A1 * | 3/2003 | Fan et al. .............. 310/216 |
| 2004/0104638 A1 | 6/2004 | Yoneda et al. |
| 2004/0189137 A1 | 9/2004 | Hashimoto et al. |
| 2005/0017596 A1 | 1/2005 | Naito et al. |
| 2005/0073213 A1 * | 4/2005 | Naito et al. ............ 310/218 |
| 2007/0018528 A1 | 1/2007 | Naitou et al. |
| 2007/0020985 A1 | 1/2007 | Naitou et al. |

FOREIGN PATENT DOCUMENTS

| | | | |
|---|---|---|---|
| EP | 1746703 | A2 | 1/2007 |
| EP | 1746704 | A2 | 1/2007 |
| EP | 1746705 | A2 | 1/2007 |
| JP | 60152240 | | 8/1985 |
| JP | 10-126982 | | 5/1998 |
| JP | 11-18326 | | 1/1999 |
| JP | 11-146617 | | 5/1999 |
| JP | 11-318059 | | 11/1999 |
| JP | 2000-334001 | | 12/2000 |
| JP | 2003-224939 | | 8/2003 |
| JP | 2004-80944 | | 3/2004 |
| WO | WO 01/06623 | * | 1/2001 |
| WO | WO 01/84696 | A1 | 11/2001 |
| WO | WO 2004/017488 | * | 2/2004 |
| WO | WO 2004/030187 | * | 4/2004 |

OTHER PUBLICATIONS

Office Action, EP 06 01 5069, Apr. 3, 2007.

* cited by examiner

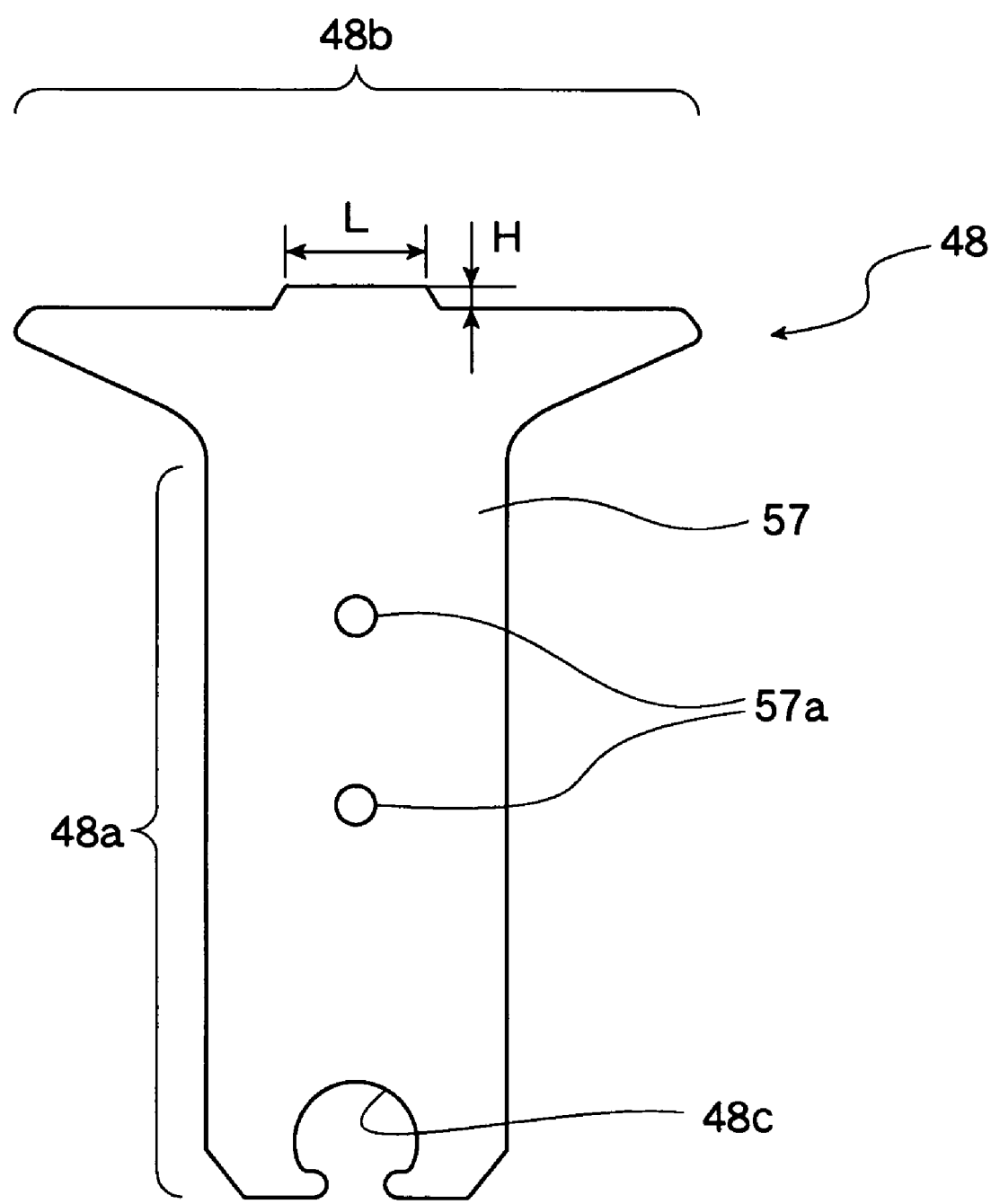

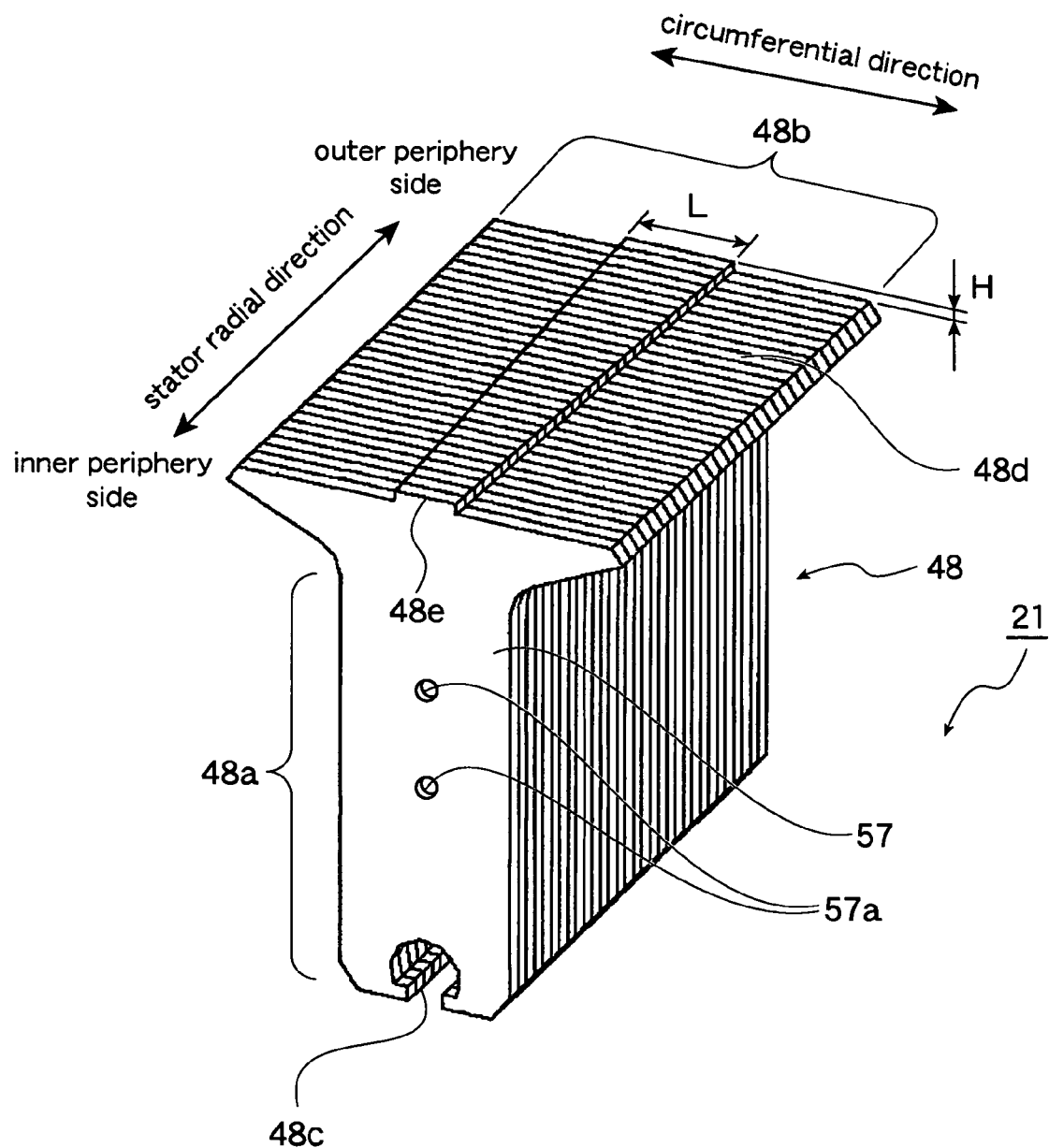

PRIOR ART

ROTARY ELECTRIC MACHINE AND ELECTRIC WHEELCHAIR MOUNTED WITH ROTARY ELECTRIC MACHINE

CROSS-REFERENCE TO RELATED APPLICATIONS

This application claims the priority benefit of Japanese Patent Application No. 2005-210496, which was filed on Jul. 20, 2005.

BACKGROUND OF THE INVENTION

1. Field of the Invention

The present invention relates to a rotary electric machine capable of suppressing a cogging torque without reducing torque and also relates to an electric wheelchair (or electrically powered wheelchair) mounted with such rotary electric machine.

2. Related Art

In a known art, as such a rotary electric machine, there has been provided an axial gap type rotary electric machine as shown, for example, in FIG. 21, in which the rotary electric machine has a stator 3 provided with teeth 2 and a rotor provided with a plurality of magnets (permanent magnets) which are disposed with a gap in a rotation axis direction.

More in detail, the each tooth (each of the teeth) 2 is composed of a plurality of steel plate sheets 2a laminated in a radial direction thereof, and a plurality of such teeth 2 are arranged and fixed side by side in the circumferential direction of a disc, i.e., substantially ring-shaped, stator yoke core. Coils are wound up around these teeth 2 through insulating material such as bobbins, not shown. Further, the teeth 2, the stator yoke and the coils are integrally fixed by means of molding resin 7 such that surfaces 2b of the teeth 2 opposing to the rotor are exposed outward.

The tooth 2 is formed by laminating a plurality of steel plates 2a having the same shapes for reducing processing cost including mold cost, and a slot (gap) S is formed between the adjacent teeth 2 for a coiling space, for example. When the rotor 3 is rotated, a torque is changed between a portion corresponding to the slot S and a portion corresponding to an opposing surface 2b of the tooth 2, thus causing a large cogging torque, which may result in generation of vibration or noise.

There are provided conventional technologies for reducing the cogging torque, such as disclosed in Japanese Patent Laid-open Application Publication No. HEI 11-18326 (Reference 1), in which dummy slot is formed at a central portion of the tooth, in the Japanese Patent Laid-open Application Publication No. 2004-80944 (P2004-80944A) (reference 2), in which a skew is formed to a stator core plate, and in the Japanese Patent Laid-open Application Publication No. HEI 10-126982 (Reference 3), in which the teeth are arranged with unequal pitches.

In the technologies mentioned above, however, in the case where the adjacent magnets and/or adjacent teeth include a wide distance therebetween, it was difficult to sufficiently reduce the cogging torque. Moreover, in the technologies of the References 2 and 3, the lamination process of the steel plates and the winding process of the coil involved complicated and troublesome workings, resulting in an increase in cost.

Moreover, in order to reduce the cogging torque, if the level of the skew disclosed in the Reference 2 and the unequal pitch disclosed in the Reference 3 are increased, resulting in decrease in an output torque, thus being inconvenient.

Especially, in the axial gap type rotary electric machine, the widths L1 and L2 of the slot openings on the inner and outer diameter sides of the adjacent teeth 2 may differ, and moreover, on the outer diameter side, the width L2 may further be larger than the gap (slot) in a general rotary electric machine (i.e., radial gap type or like). In such conventional cogging torque reducing technologies, it was accordingly difficult to reduce the cogging torque without reducing or deteriorating driving performance of the machine.

SUMMARY OF THE INVENTION

The present invention was conceived in consideration of the above prior art, and an object of the present invention is to provide a rotary electric machine capable of reducing a cogging torque, without deteriorating performance of the rotary electric machine, which is an axial gap type even provided with unequal slot opening, and also provide an electric wheelchair mounted with such rotary electric machine.

This and other objects of the present invention can be achieved according to the present invention by providing, in one aspect, a rotary electric machine comprising:

a stator including a plurality of teeth which are each wound up a coil and a stator yoke core connecting the respective teeth; and a rotor provided with magnets disposed so as to oppose to the teeth, respectively, with a space therebetween, wherein each of the teeth has a surface opposing to the magnet of the rotor, and the opposing surface is formed with a protruded portion at substantially central portion thereof in the circumferential direction of the stator.

In a preferred embodiment of this aspect, it is desirable that the opposing surface of the tooth is opposed to the magnet with a gap in a rotation axis direction.

Furthermore, the protruded portion may have a circumferential width which differs along a radial direction thereof. The protruded portion may have a height different along a radial direction thereof.

Each of the teeth may be formed by laminating a plurality of steel plates having same shape in a radial direction of the teeth. The respective steel plates are fitted together by fitting a protrusion formed to one steel plate into a recess formed to an adjacent steel plate.

It may be desired that each of the teeth is formed by laminating a plurality of steel plates in a circumferential direction of the teeth.

The magnet may be divided into a plurality of sections each having a square shape.

In another aspect of the present invention, there is also provided an electric wheelchair comprising:

a frame structure constituting a vehicle body frame;

a seat disposed on the frame structure;

a pair of driving wheel units including two wheels;

a rotary electric machine mounted to each of the paired driving wheel units; and an operation member operatively connected to the electric motor for operating the driving wheel units, the rotary electric machine has the structures defined in the above aspects.

According to the present invention of the characteristics and structures mentioned above, since the opposing surface of the tooth opposing to the magnet is formed with the protruded portion at substantially the central portion thereof in the circumferential direction of the stator, the protruded portion is attracted more strongly by the magnet than the other portion of the opposing surface of the tooth. Accordingly, by properly setting the height and width of the protruded portion, the attraction force of the protruded portion can negate the cogging torque, so that the cogging torque can be reduced. Therefore, even in a rotary electric machine having a wide slot opening or axial gap type rotary electric machine, the cogging torque can be reduced without lowering or deteriorating the operational performance.

Moreover, forming the protruded portion on the opposing surface of each of the teeth is required in the present invention and there is no need to change the interval or distance between the adjacent teeth or magnets, so that a reduction in torque is not so large as in a conventional structure provided with skew or unequal pitch to the teeth.

Furthermore, the rotary electric machine of the present invention can be structured as an axial gap type, so that the present invention can provide a rotary electric machine having compact, flat, and light weight structure with low cogging torque. With the axial gap type rotary electric machine, since it is necessary to laminate a plurality of steel plates having the same shape for realizing low cost, for example, of mold cost, the slot opening width becomes wide on the outer diameter side, and for this reason, it was difficult to reduce the cogging torque under the condition of providing a dummy slot as in the conventional structure, but according to the present invention, the protruded portion for negating the cogging torque is formed to the tooth, so that the cogging torque reduction can be realized even for the axial gap type rotary electric machine.

Still furthermore, since the protruded portion has the circumferential width which differs along the radial direction thereof, the cogging torque can be effectively reduced by optimally setting the width of the protruded portion in accordance with the change of the slot opening width in the radial direction of the tooth.

Still furthermore, since the height of the protruded portion differs along the radial direction thereof, the cogging torque can be effectively reduced by optimally setting the height of the protruded portion in accordance with the change of the slot opening width in the radial direction of the tooth.

Still furthermore, since each of the teeth is formed by laminating the steel plates having the same shape and the protruded portion in the radial direction, the steel plates can be formed by the same mold, reducing the working cost.

Since each steel plate is formed with a protrusion and a recess, the lamination thereof can be easily completed by fitting the protrusion into the recess of the adjacent steel plates.

Still further more, each of the teeth can be formed by laminating steel plates in the circumferential direction, thus being easily formed.

Still furthermore, by forming the magnets of the rotor so as to each provide a square shape, the rotary electric machine can be provided with low cogging torque and manufactured at low cost. That is, by forming the magnet into simple square shape, working cost of rare earth sintered magnet can be reduced to be low, thus providing the rotary electric machine at low cost. In addition, the formation of the magnet into the square shape may widen the gap between the magnets on the outer diameter side and may cause a large cogging torque. However, by forming the protruded portion to the tooth, the low cogging torque can be realized.

Still furthermore, the electric wheelchair mounted with the improved rotary electric machine having compact structure and high output performance can be provided. According to such electric rotary machine having the reduced cogging torque, the electric wheelchair with reduced vibration and noise can be provided, thus being advantageous for indoor use thereof.

The nature and further characteristic features of the present invention will be made more clear from the following descriptions made with reference to the accompanying drawings.

BRIEF DESCRIPTION OF THE DRAWINGS

In the accompanying drawings:

FIG. 9 is a front view of the tooth of the stator of the electric motor according to the first embodiment;

FIG. 10 includes FIGS. 10A and 10B, in which

FIG. 12 includes FIGS. 12A and 12B, in which

FIG. 15 is a perspective view showing another example of a tooth according to the second embodiment;

FIG. 16 includes FIGS. 16A, 16B and 16C which correspond to FIG. 12 and in which

DESCRIPTION OF THE PREFERRED EMBODIMENT

Preferred embodiments of the present invention will be described hereunder with reference to the accompanying drawings.

[First Embodiment]

The first embodiment of the present invention is represented by FIGS. 1 to 13.

Figure 1:
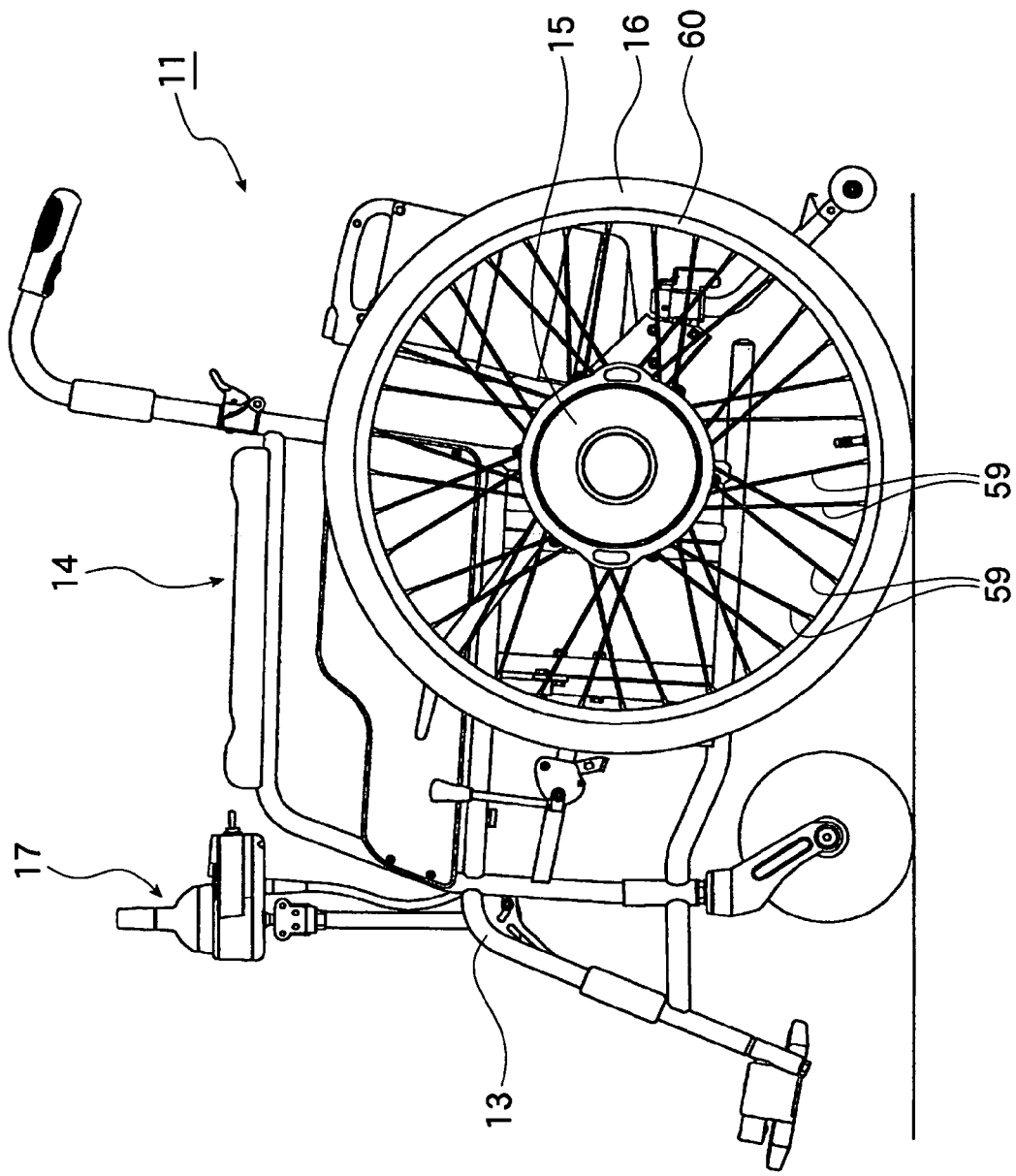
FIG. 1 is a side view of an electric wheelchair mounted with an electric motor according to a first embodiment of the present invention.

With reference to FIG. 1, reference numeral 11 denotes an electric wheelchair or electrically powered wheelchair mounted with an electric motor 12 as a rotary electric machine according to the present invention, and the electric wheelchair is driven and traveled by the driving force of the electric motor 12.

The electric wheelchair 11 is provided with a frame 13 as a framework of a vehicle (electric wheelchair body), a seat 14 on which a user sits and a pair of driving wheel units 15 in which the electric motors 12 are mounted. When an operation unit 17 of the electric wheelchair 11 is operated, the paired driving wheel units 15 are driven so as to drive driven wheels 16 by predetermined amount (distance). The driven wheels 16 are operated independently, and by the operation of the operation unit 17, the driven wheels 16 are changed in their rotating directions and driven speed, respectively, optionally.

Figure 2:
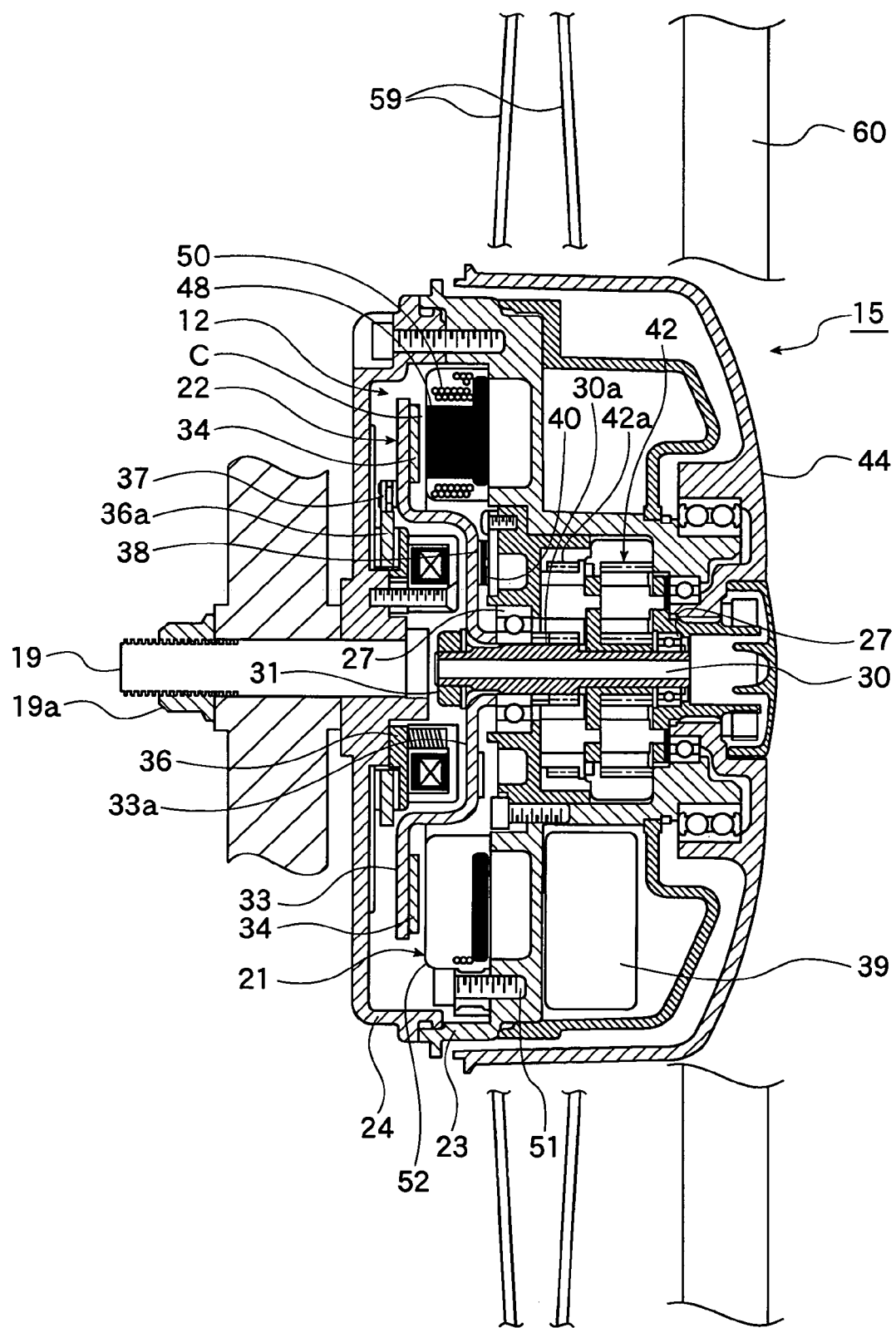
FIG. 2 is a sectional view of the electric motor, i.e., rotary electric machine, for the electric wheelchair of the first embodiment.

The driving wheel unit 15 is composed, as a unit, of the electric motor 12, the driving unit, the driven wheel 16 and so on, and as shown in FIG. 2, the driving wheel unit 15 is fixed to the frame 13 by means of bolt 19 and nut 19a.

The electric motor 12, i.e., rotary electric machine, is of an axial gap type composed of a stator 21 and a rotor 22, which are accommodated in a space defined by a case 23 and a cover 24. The bolt 19 is planted to the cover 24.

The stator 21 is fastened to the case 23 by means of a bolt 51, and on the other hand, the rotor 22 is fitted to a rotor shaft 30, through serration fitting, provided for the case 23 to be rotatable through bearings 27, 27 and fixed thereto by nut 31.

Figure 3:
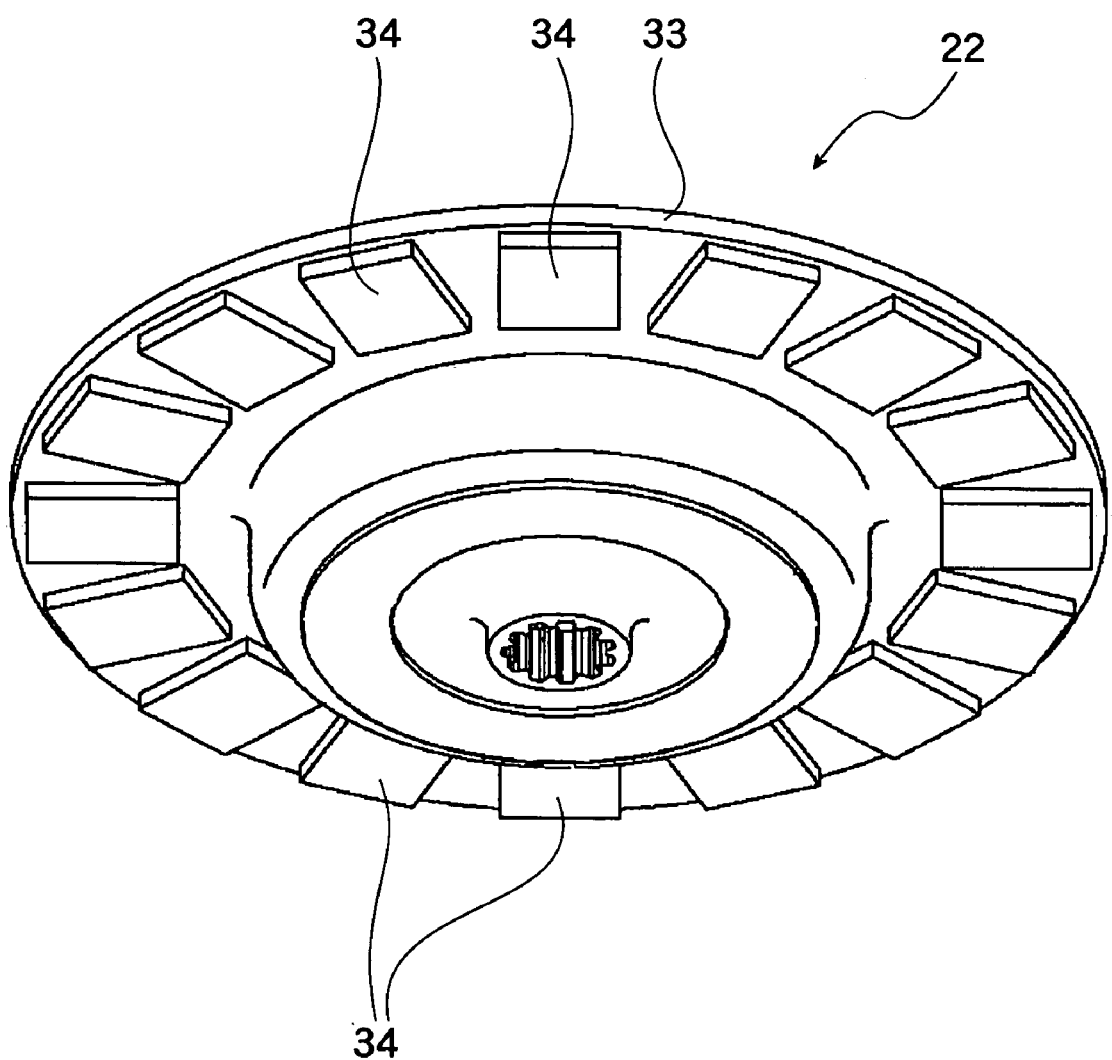
FIG. 3 is a perspective view of a rotor of the electric motor of FIG. 2.
Figure 4:
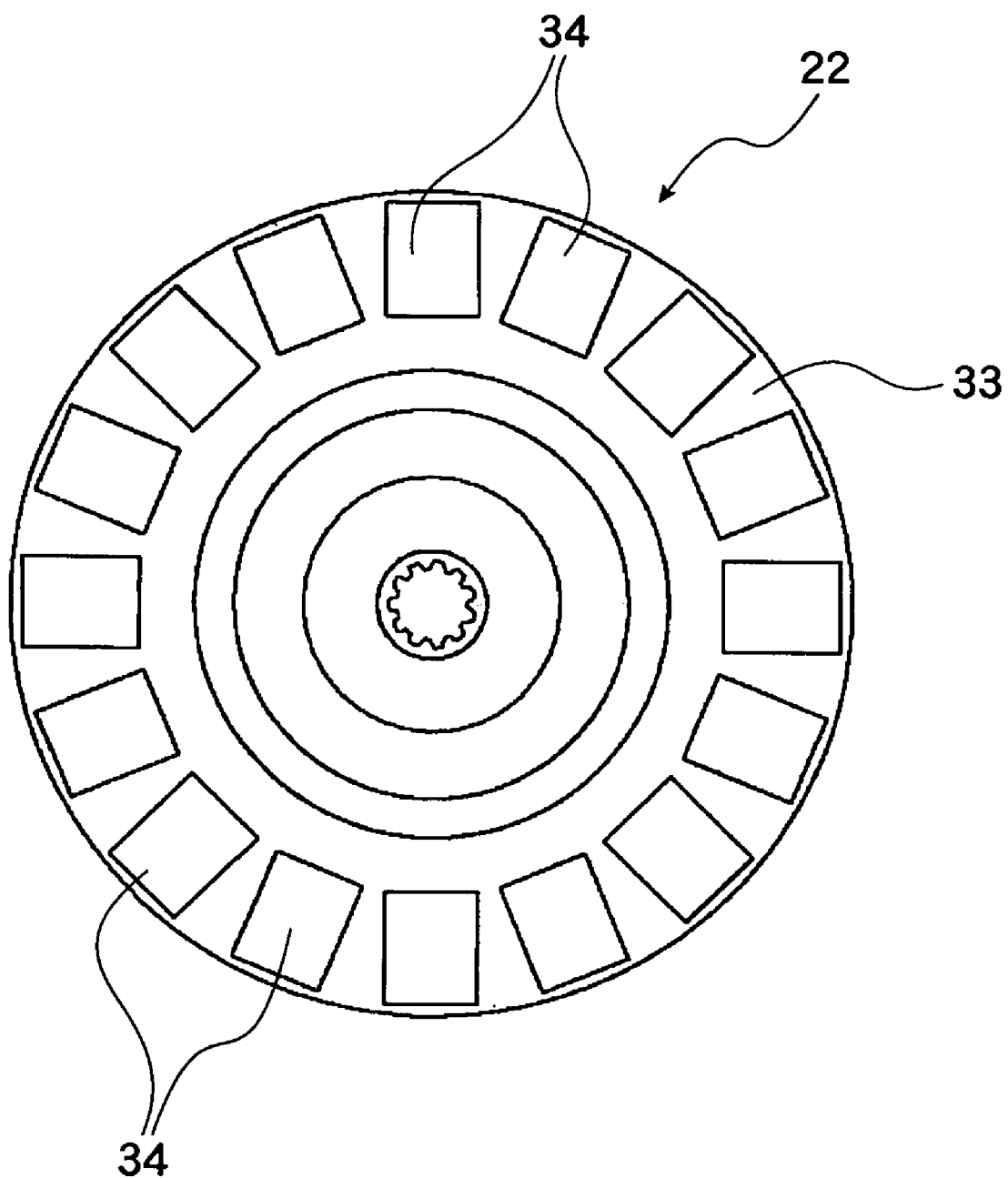
FIG. 4 is a front view of the rotor of the electric motor of FIG. 2.
Figure 5:
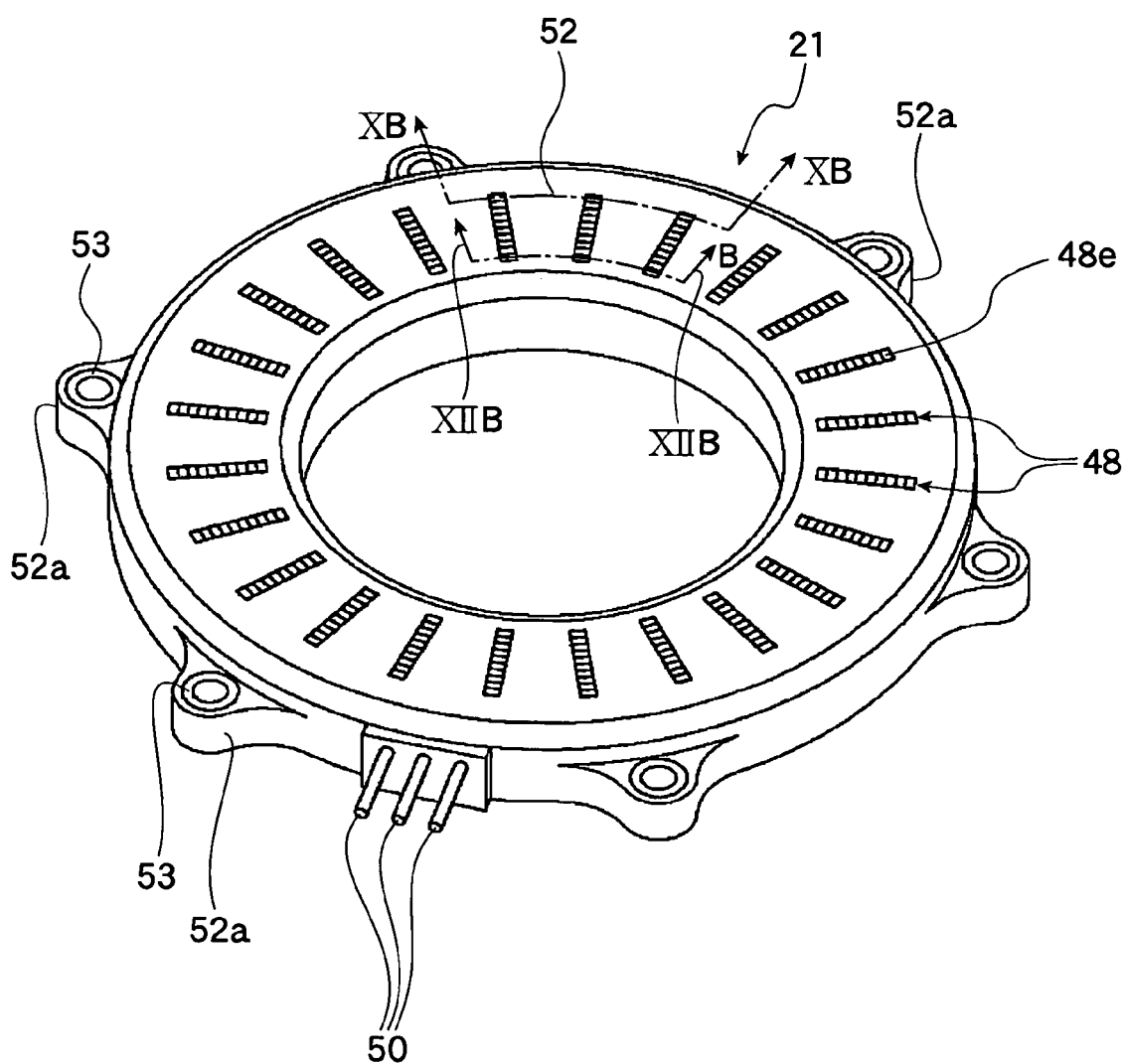
FIG. 5 is a perspective view of a stator of the electric motor of the electric wheelchair of the first embodiment.
Figure 6:
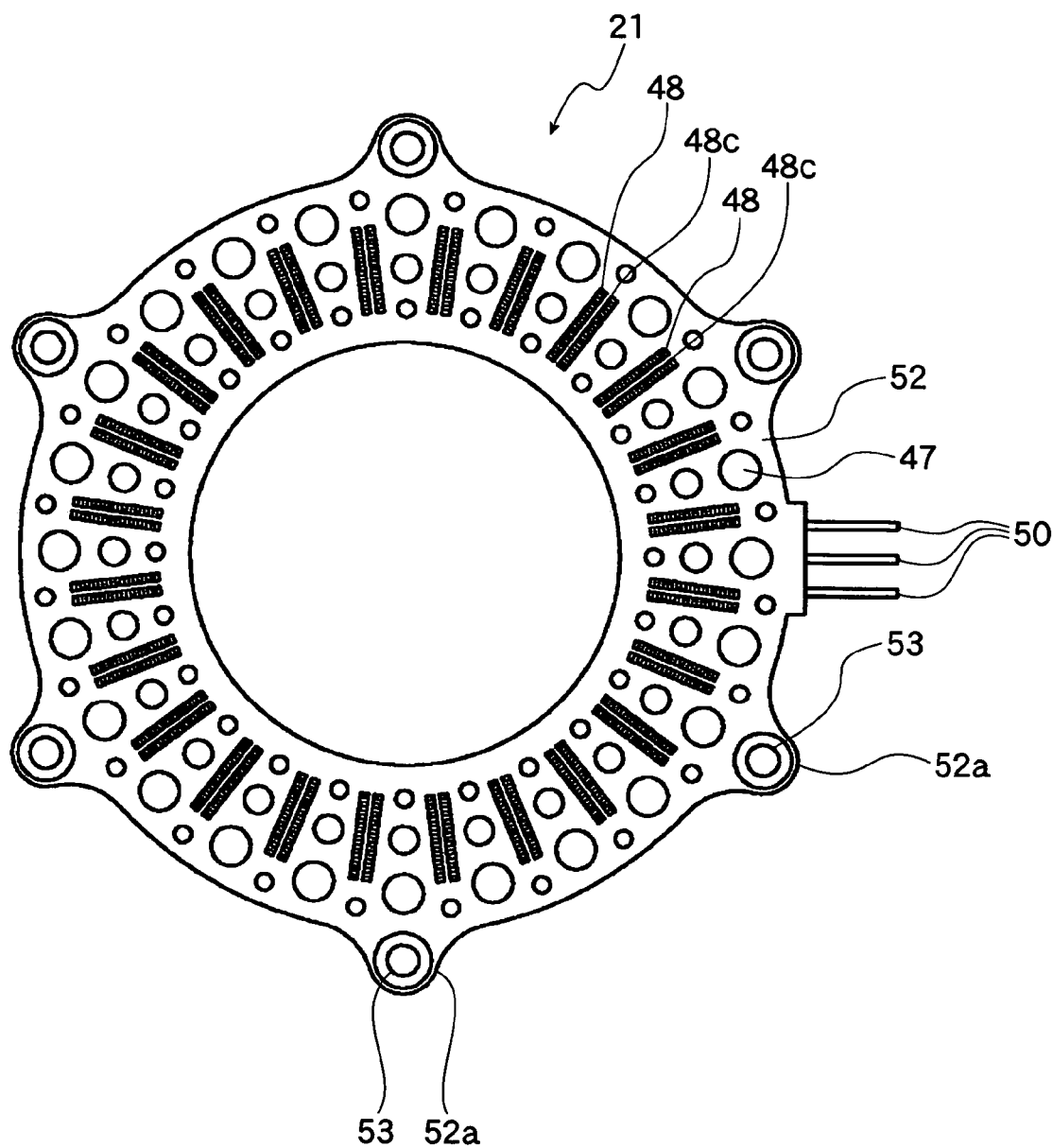
FIG. 6 is a back-side view of the stator of FIG. 5.
Figure 7:
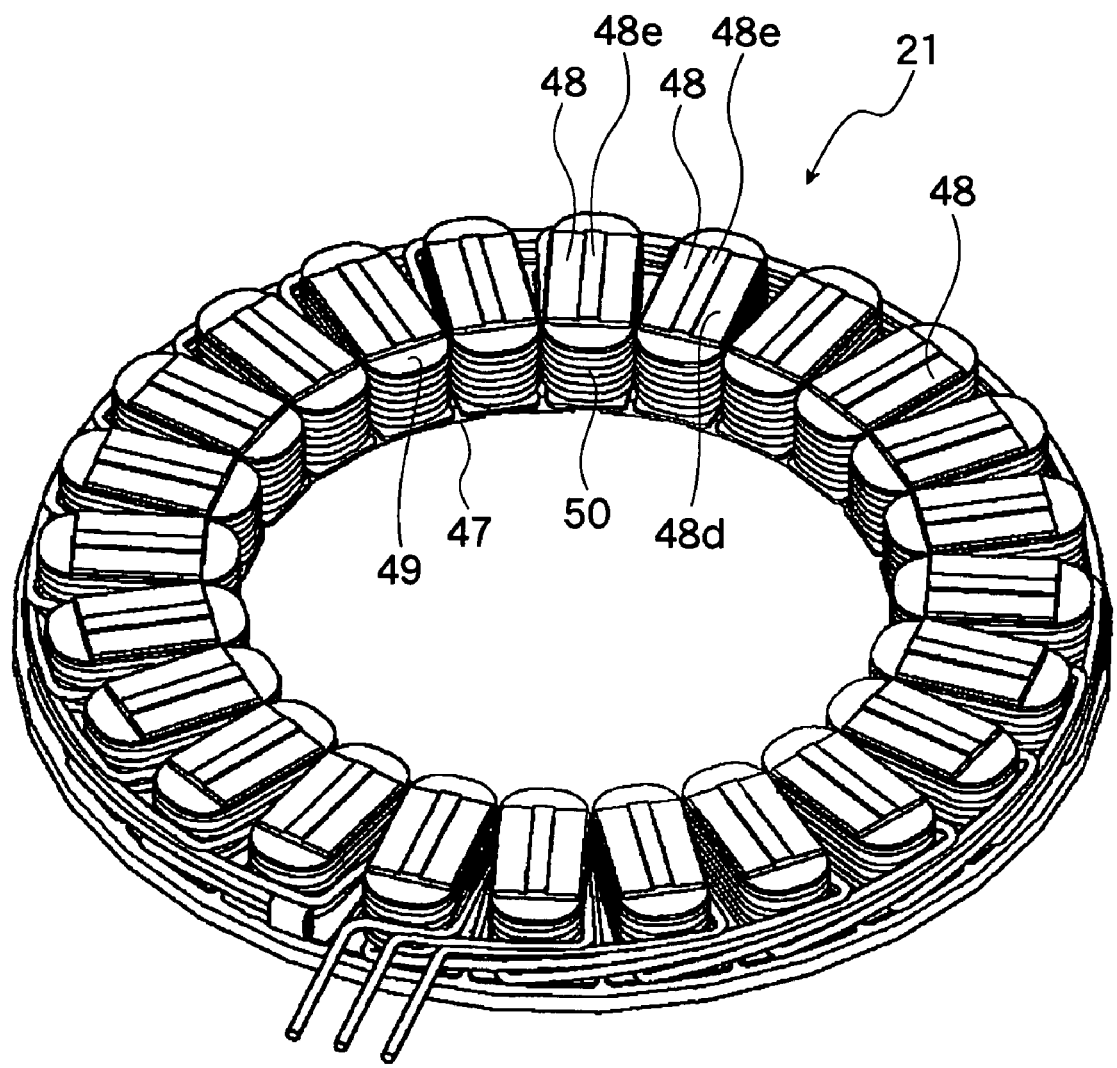
FIG. 7 is a perspective view of the stator, before molding, of the electric motor according to the first embodiment.

The rotor 22 has, as shown in FIGS. 3 and 4, a disc shaped rotor yoke 33, which has a central portion fitted to the rotor shaft 30 through the serration fitting. A plurality of magnets 34, each having a rectangular shape, are arranged and fixed to the peripheral edge portion of the rotor yoke 33 at a predetermined constant interval in the circumferential direction thereof. These magnets 34 are disposed so as to oppose to the stator 21 with a gap C (FIG. 2) in the rotation axis direction.

These magnets 34 are arranged so that N and S poles are adjacently alternated and bonded and fixed to the rotor yoke 33 in shape of circle.

The rotor yoke 33 is press-worked as shown in FIGS. 2 and 3 so as to provide a central recessed shape 33a, and in this recessed portion 33a, an electromagnetic brake 36 fixed to the cover 24 is accommodated. An annular rotary body 36a and the rotor 22, of which rotations are stopped by the electromagnetic brake 36, are made stationary in the rotating direction through a pin 37. Moreover, on the other hand, a sensor magnet 38 is bonded and fixed to the side opposing to the recessed portion 33a, and a pole position sensor (hole IC) 40 opposing to the sensor magnet 38 is fixed to the case 23. The pole position sensor 40 is electrically connected to a controller 39, and the pole position of the rotor 22 is detected by the pole position sensor 40.

Further, a sun-gear 30a is mounted to the rotor shaft 30 so as to be meshed with a two-staged planetary gear 42a of a planetary reduction gear 42. The planetary reduction gear 42 reduces the rotation of the rotor 22, which is then transmitted to a hub 44, and the rotation of the hub 44 rotates the driven wheel 16.

On the other hand, the stator 21 is provided with a substantially disc (ring) shaped stator yoke core 47, a plurality of teeth 48 arranged in the circumferential direction of the stator yoke core 47 with a predetermined interval and a coil 50 wound up around each of the teeth (i.e., tooth) 48 by means of bobbins 49. These stator yoke core 47, the teeth 48 and the coils 50 are integrally molded and fastened together by the molding resin 52. At this time, a plurality of collars 53 are inserted around the stator 21 to thereby simultaneously form mount flanges 52a.

These mount flanges 52a are fixed to the case 23 by means of bolts 51.

The coil 50 is coupled with each of U, V and W-phases, and one end of each coupling coil is electrically connected (neutral point) and the other one end thereof is led outside of the mold so as to be connected to a driver.

Figure 8:
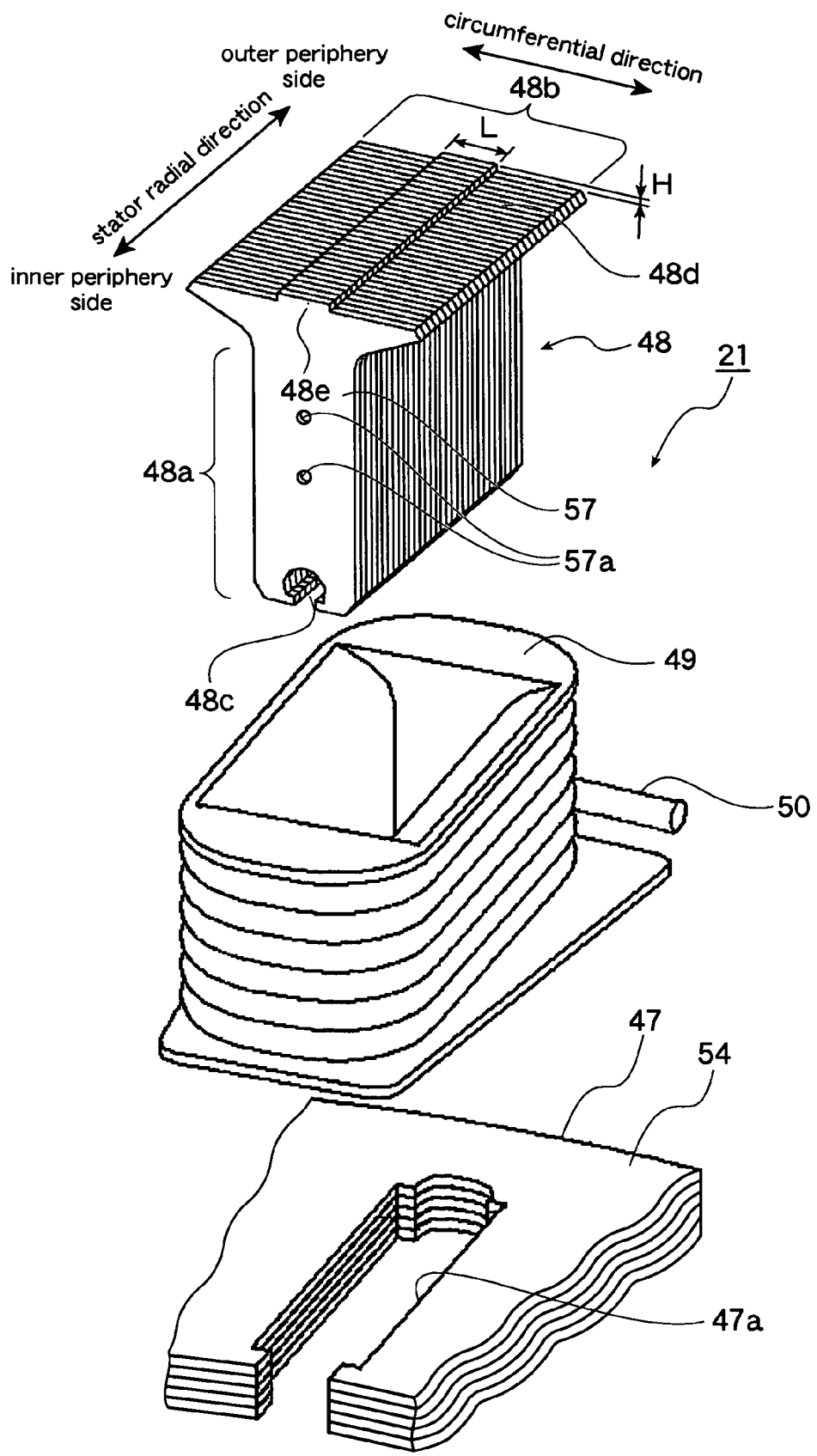
FIG. 8 is a developed perspective view showing a portion of the stator of the electric motor of the electric wheelchair of the first embodiment.

More in detail, the stator yoke core 47 is formed from a plurality of disc-shaped (substantially ring shape) magnetic steel plates 54, which are laminated as shown in FIG. 8, and formed with fitting holes 47a into which teeth 48 are inserted.

The tooth 48 is formed by laminating a plurality of magnetic steel plates 57 having the same shape, as shown in FIG. 8, so as to provide a T-shape, and is composed of a leg portion 48a of the T-shaped tooth 48 and a head portion 48b thereof. The leg portion 48a includes a portion (lower end portion in FIG. 8) which is fitted into a fitting hole 47a of the stator yoke core 47. This end portion is formed with a resin filling groove 48c in which a molding resin 52 is filled so as to prevent the tooth 48 from coming off from the stator yoke core 47.

Moreover, the head portion 48b of the T-shaped tooth has a width wider than that of the leg portion 48a and has a surface 48d opposing to the magnet 34 of the rotor 22. The opposing surface 48d is formed with a protruded portion 48e extending in the radial direction at substantially the central portion thereof in the circumferential direction of the stator. The protruded portion 48e has a height and width along its entire length direction. The opposing surface 48d except the central protruded portion 48e are embedded with the molding resin 52 so that only the protruded portion 48e is exposed outward.

The opposing surface 48d including the protruded portion 48e is disposed to be opposed to the magnet 34 of the rotor 22 with a gap C in the rotation axis direction.

Further, the steel plate 57 forming the tooth 48 is formed at the leg portion 48a with a plurality of half pierce portions 57a, two portions in the illustration, as fitting portions for fixing a plurality of laminated magnetic steel plates 57. Further, the half pierce portion 57a is in the form of half blind hole shape (having protruded half portion and recessed half portion), and the protruded half portion 57a of one steel plate 57 is fitted in to the recessed half portion 57a of adjacent one steel plate 57.

Further, in FIG. 2, reference numeral 59 denotes a spoke of the wheel and 60 denotes a hand rim.

The first embodiment will be operated in the manner mentioned hereunder.

When no current passes through the coil 50, a magnetic force by the magnets 34 acts between the stator 21 and the rotor 22 to thereby form magnetic flux therebetween.

FIGS. 10 and 12 are views explaining this action.

In the conventional structure, a relatively large cogging torque is generated due to the function of the magnetic flux. In the present invention, however, such cogging torque can be reduced by the formation of the protruded portion 48e to the tooth 48.

With reference to FIGS. 10 (10A, 10B) and 12 (12A, 12B), the distance "a" between the magnets and the distance "b" between the teeth are wide on the outer periphery side of FIG. 10. On the other hand, the distance "a" between the magnets and the distances "b" between the teeth are narrow on the inner periphery side as shown in FIG. 12. Further, the cogging torque is based on the magnetic force of the magnet 34, therefore in this embodiment explanation will be made at the time when no current passes through the coil 50. In the case where current is passed, the cogging torque is influenced by the magnetic flux of the coil 50, but basically the same explanation will be applied in both the cases.

Figure 10A:
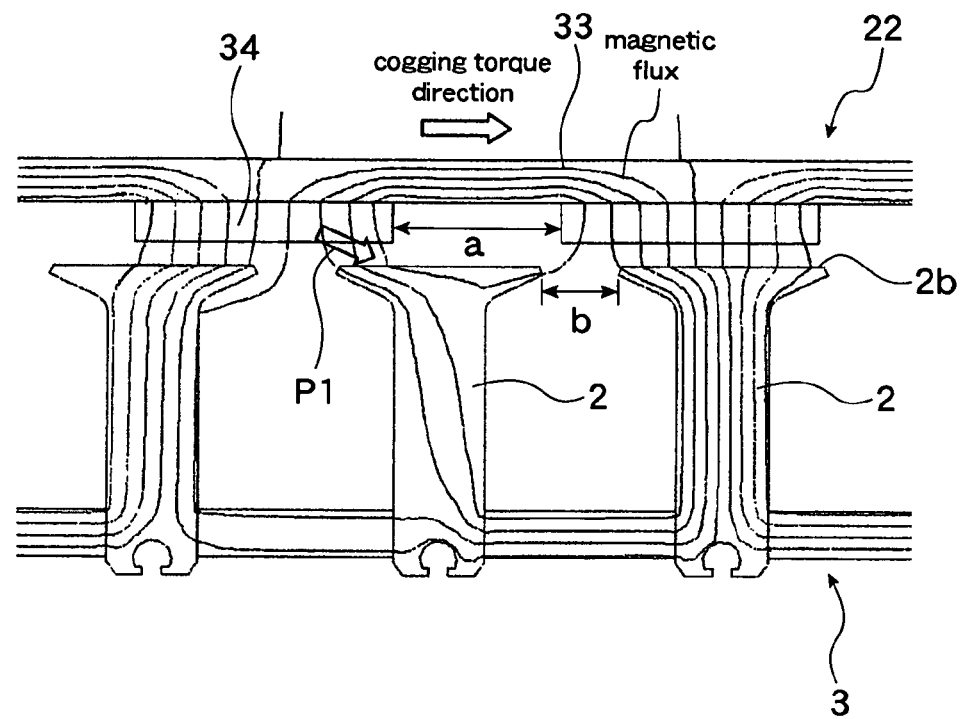
FIG. 10A is a view taken along the outer periphery side line XA-XA in FIG. 21 mentioned later and FIG. 10B is a view taken along the outer periphery side line XB-XB in FIG. 5.
Figure 10B:
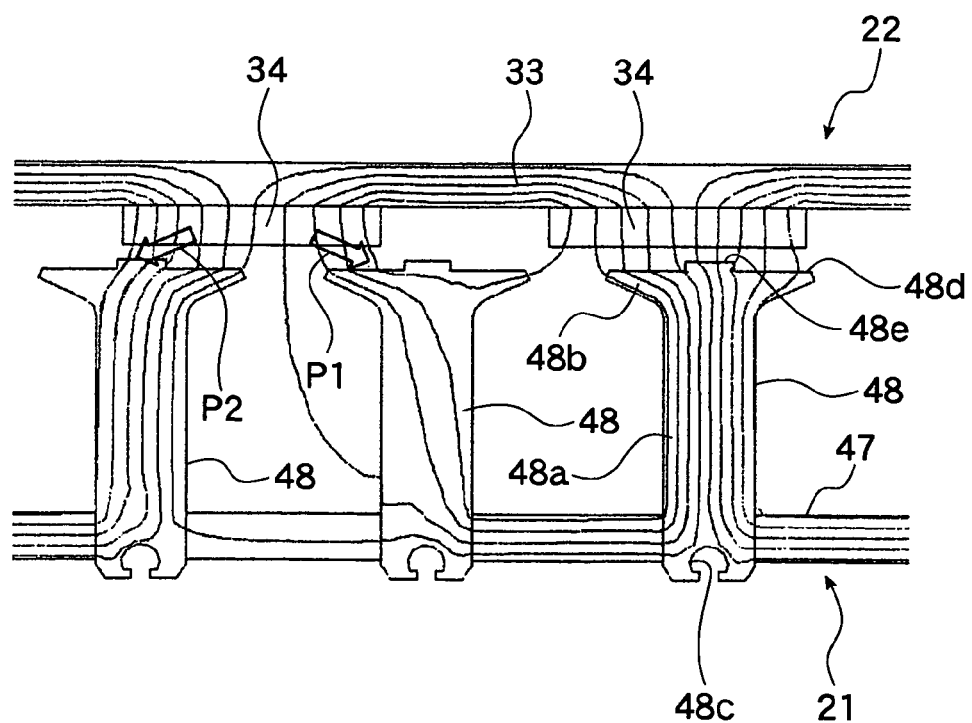

That is, on the outer periphery side shown in FIG. 10A showing a conventional structure of the teeth 2, a suction (attracting) force P1 due to the magnets 34 is generated, thereby generating the cogging torque. In this case, the electrical angle in the positions shown in FIGS. 10A and 10B is an angle θ shown in FIG. 11. Thus, in the conventional technology, as such cogging torque is caused, the cogging torque is largely varied as shown in FIG. 11 with characteristic line A.

Figure 11:
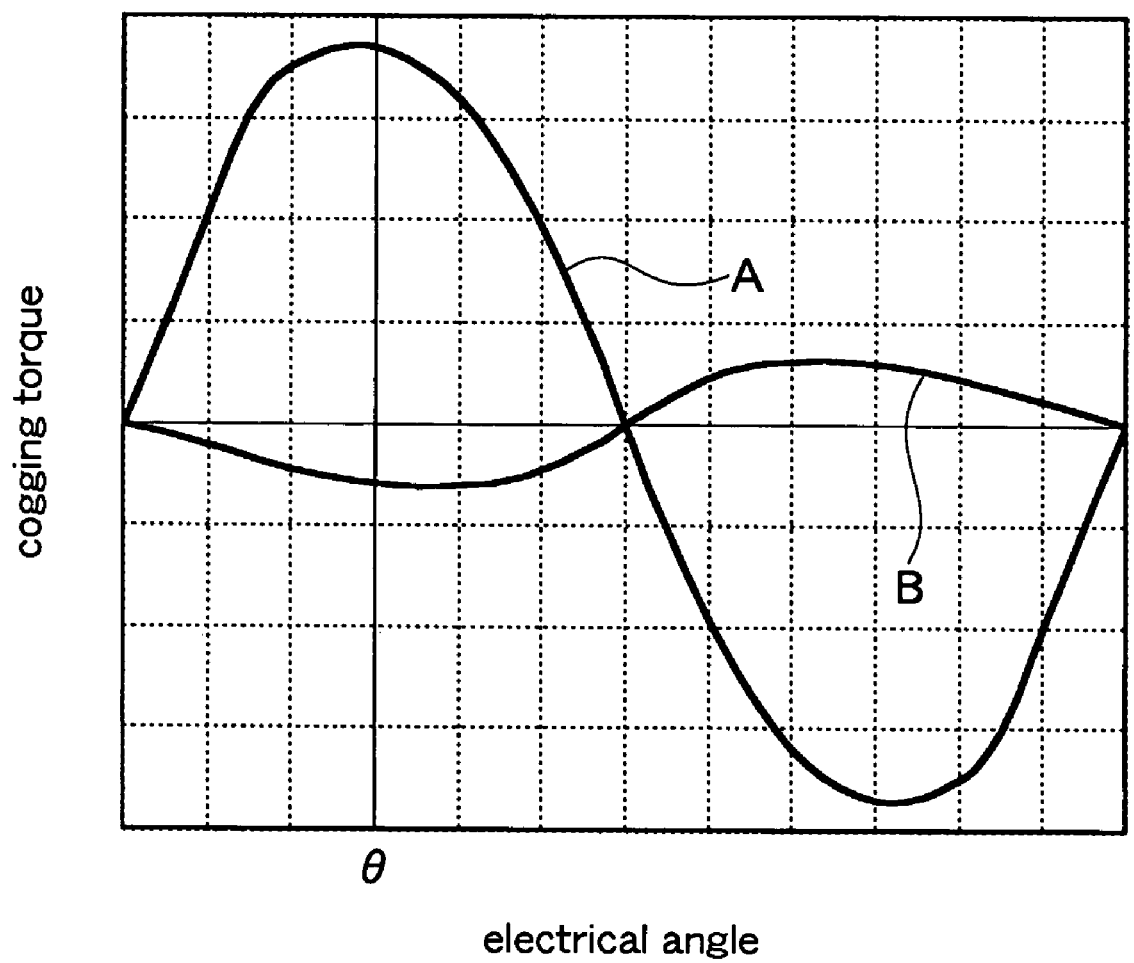
FIG. 11 is a graph showing relationship between cogging torque and electrical angle in connection with the types represented by FIGS. 10A and 10B, respectively.

On the other hand, in the case of the present embodiment shown in FIG. 10B, a suction force P2 negating rotating directional component of the suction force P1 is generated by the formation of the protruded portion 48e to the tooth 48, so that the cogging torque can be reduced, and as shown in FIG. 11 with characteristic line B, the peak value of the cogging torque can be reduced to be substantially one tenth (1/10), thus suppressing the variation of the cogging torque.

Figure 12A:
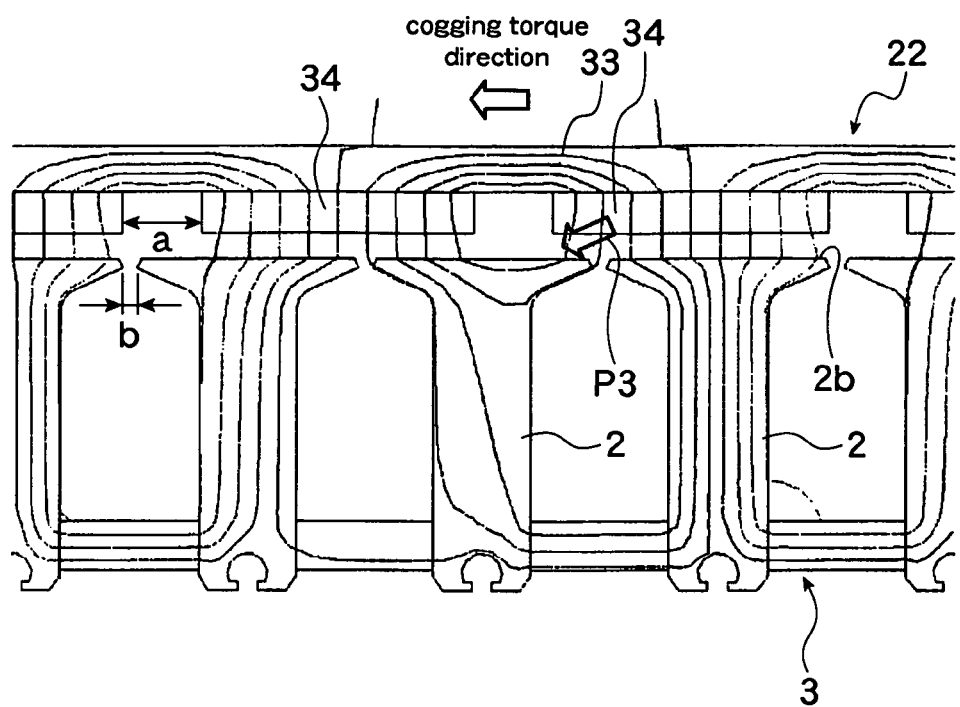
FIG. 12A is a view taken along the inner periphery side line XIIA-XIIA in FIG. 21
Figure 12B:
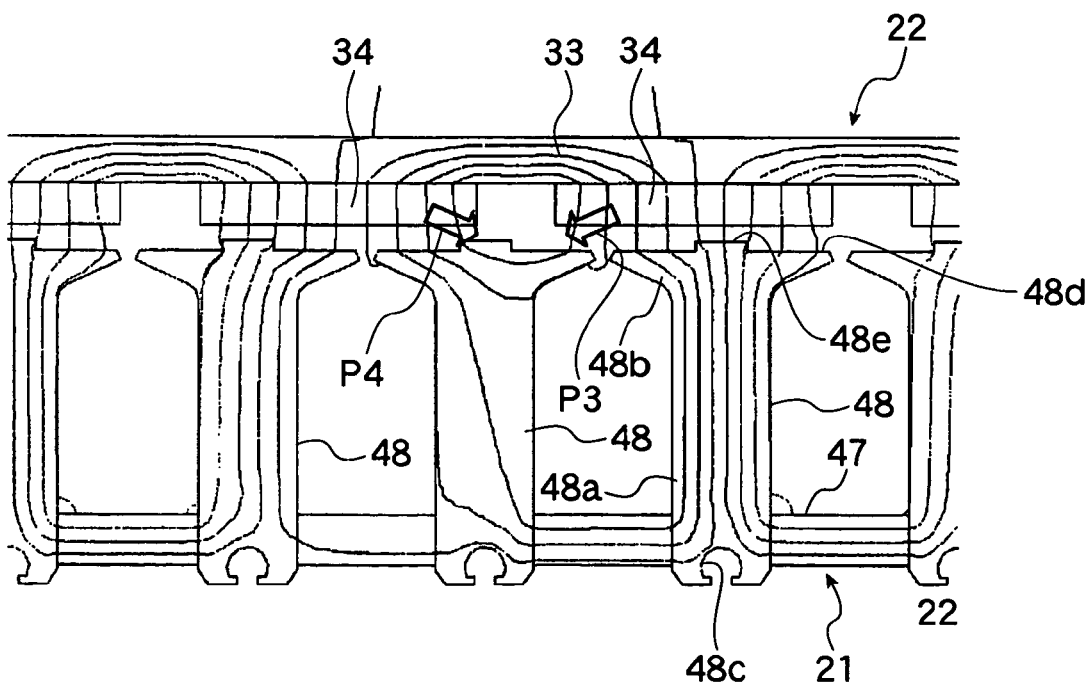
FIG. 12B is a view taken along the inner periphery side line XIIB-XIIB in FIG. 5.

Furthermore, on the inner periphery side shown in FIG. 12A showing a conventional structure of the teeth 2, a suction (attracting) force P3 due to the magnets 34 is generated, thereby generating the cogging torque. In this case, the electrical angle in the positions shown in FIGS. 12A and 12B is an electrical angle θ shown in FIG. 13. Thus, in the conventional technology, as such cogging torque is caused, the cogging torque is largely varied as shown in FIG. 13 with characteristic line C though the variation in the cogging torque is smaller than that on the outer periphery side.

Figure 13:
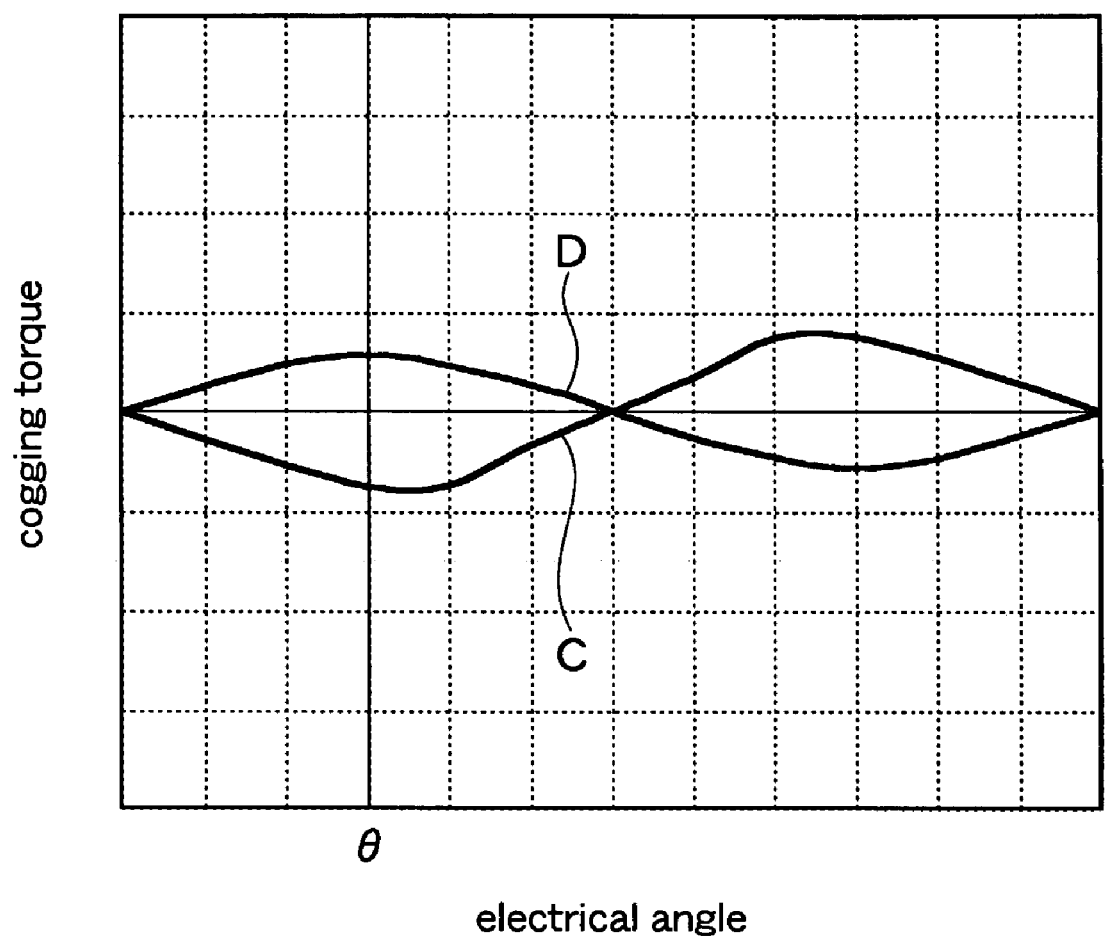
FIG. 13 is a graph showing relationship between cogging torque and electrical angle in connection with the types represented by FIGS. 12A and 12B, respectively.

On the other hand, in the case of the present embodiment shown in FIG. 12B, a suction force P4 negating rotating directional component of the suction force P3 is generated by the formation of the protruded portion 48e to the tooth 48, so that the cogging torque can be reduced, and as shown in FIG. 13 with characteristic line D, the peak value of the cogging torque can be reduced, thus suppressing the variation of the cogging torque.

Further, although, herein, only the partial characteristics on the inner and outer periphery sides are shown, it may be possible to determine the width L and the height H of the protruded portion 48e of each of the teeth 48 so as to make small an integrated value (resultant force). Accordingly, by making constant the shapes of the protruded portion 48e on the inner and outer periphery sides, there can be provided an electric motor 12, with a low cogging torque, which can be easily and manufactured at low cost.

In the meantime, since the tooth 48 shown in FIG. 8 of the present invention is formed by laminating a plurality of steel plates 57 of the same kind, the processing cost and the mold cost can be suppressed, and in addition, these steel plates 57 are calked and fixed together by means of half pierce portions 57a, so that they are easily laminated and assembled.

Furthermore, the tooth 48 is formed with the resin filling groove 48c having a narrow entrance and large inner space, which is filled up with the molding resin 52, so that the tooth can be firmly fixed to the stator yoke core 47, thereby preventing the teeth from coming off therefrom.

Still furthermore, the tooth 48 can be prevented from coming off against the suction force of the magnet 34 by covering, with the molding resin 52, the portion of the opposing surface 48d of the tooth 48 other than the protruded portion 48e.

Incidentally, it is effective to form the magnet 34 with rare earth sintered magnet for obtaining a compact and high performance torque motor, but complicated shaping, such as sector shape, of the rare earth sintered magnet involves much processing cost. Therefore, if the rare earth sintered magnet is worked into a simple shape, the processing cost will be reduced. In addition, in the combination with the conventional stator, since a gap between the magnet and the circumferential direction thereof is made wide, particularly, on the outer periphery side, the cogging torque becomes very large, thus being not practical in use.

According to the present invention, however, since the stator 21 is combined with the rotor 22 provided with square-shaped magnets 34, the electric motor 12 having large output torque with low cogging torque can be provided with low cost.

Further, according to the electric motor 12 of the embodiment of the present invention, the cogging torque can be effectively reduced, so that an electric wheelchair 11 mounted with such electric motor 12 can be also preferably provided with less vibration and noise.

[Second Embodiment]

The second embodiment of the present invention will be described hereunder with reference to FIGS. 14 to 17.

Figure 14:
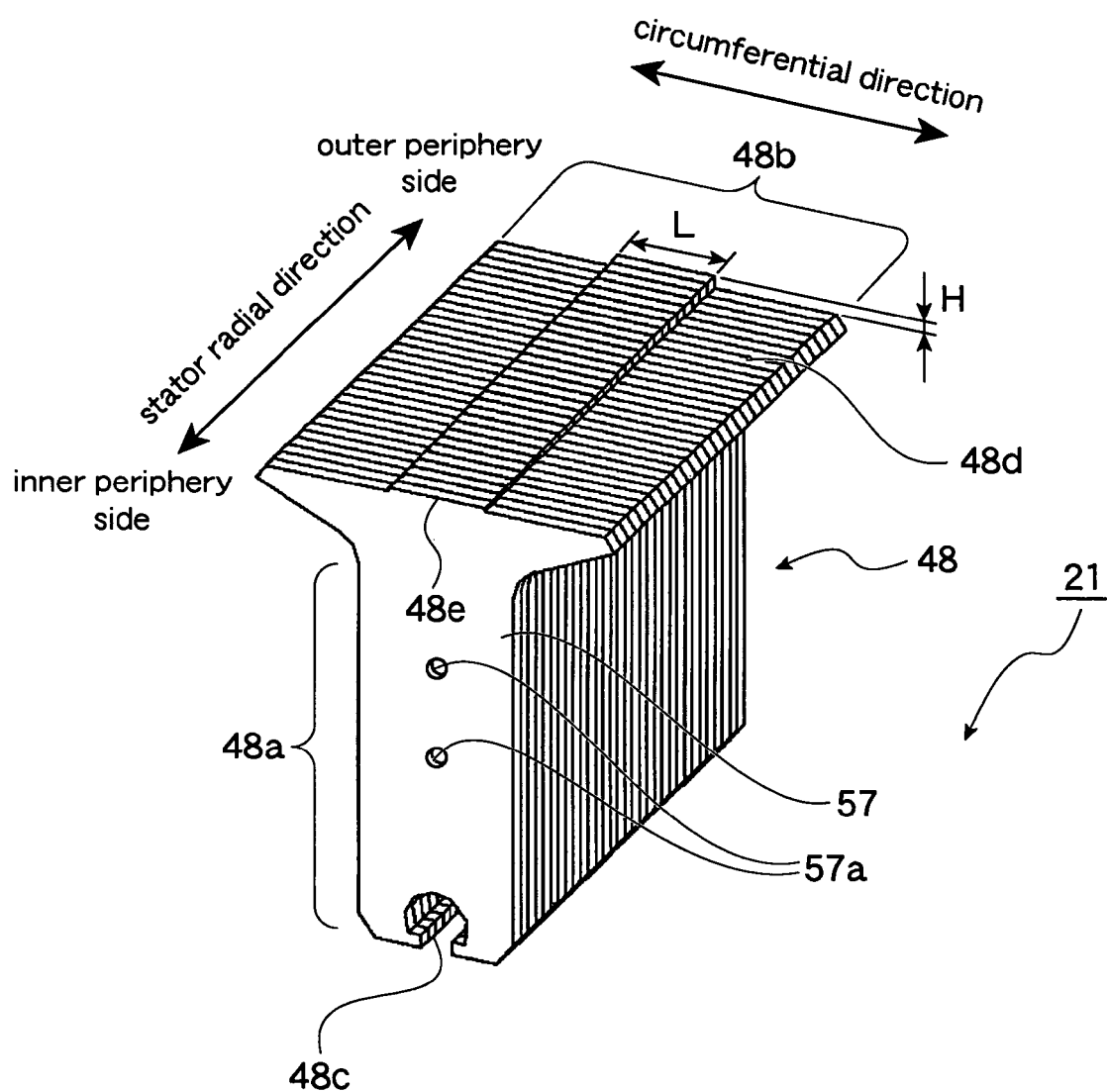
FIG. 14 is a perspective view showing a tooth according to a second embodiment of the present invention.

With reference to FIG. 14, the tooth (each of teeth) 48 is formed with a protruded portion 48e having a constant width L and a height H which is gradually increased toward the outer periphery side. On the other hand, the tooth shown in FIG. 15 shows a protruded portion 48e having a constant height H and a width which is narrower on the inner periphery side.

As mentioned above, since the shapes of the protruded portions 48e are formed not to be constant and adjusted in conformity with the unequal slot opening, thereby effectively negating the cogging torque.

Figure 16A:
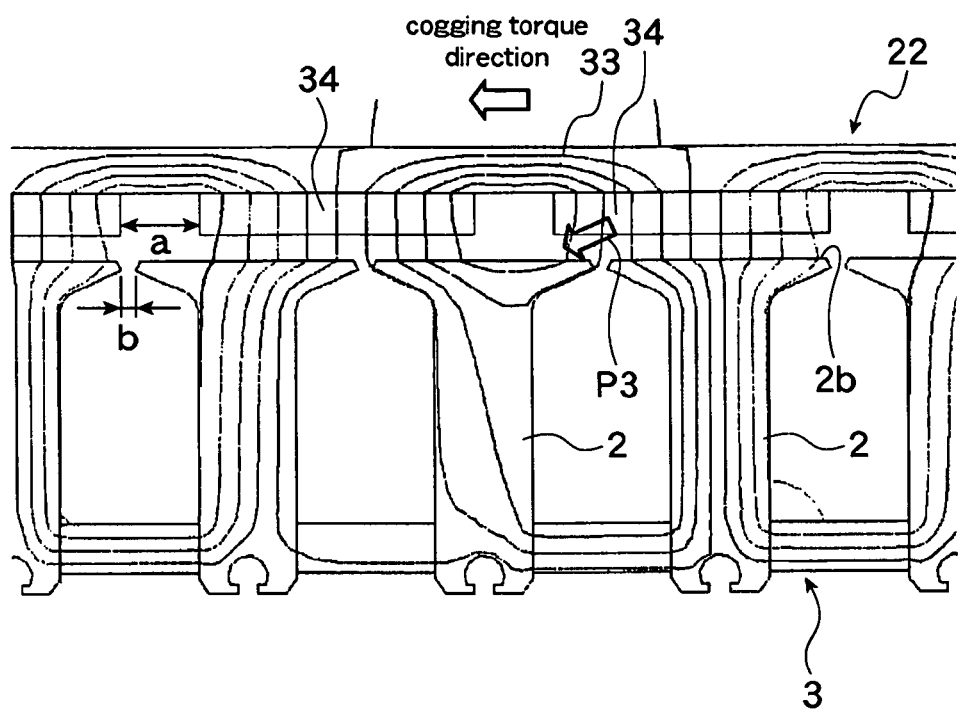
FIG. 16A is a conventional type provided with no protruded portion to the tooth.
Figure 16B:
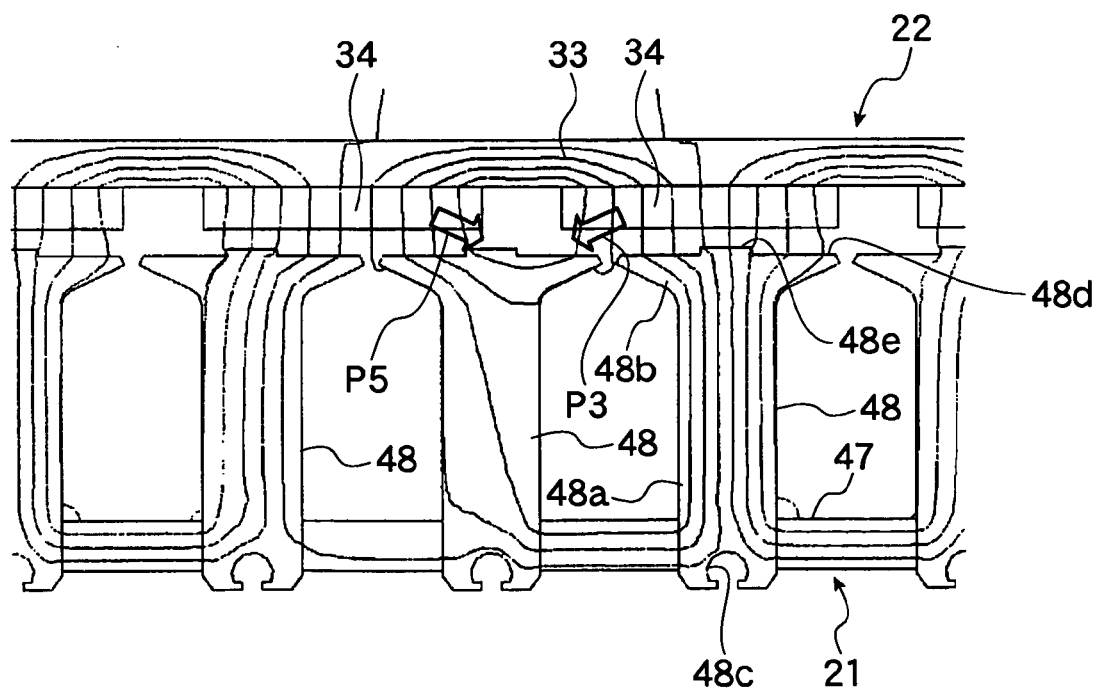
FIG. 16B is a type according to the second embodiment of the present invention provided with a protruded portion having a width equal to that of FIG. 10B and a height lower than that of FIG. 10B.
Figure 16C:
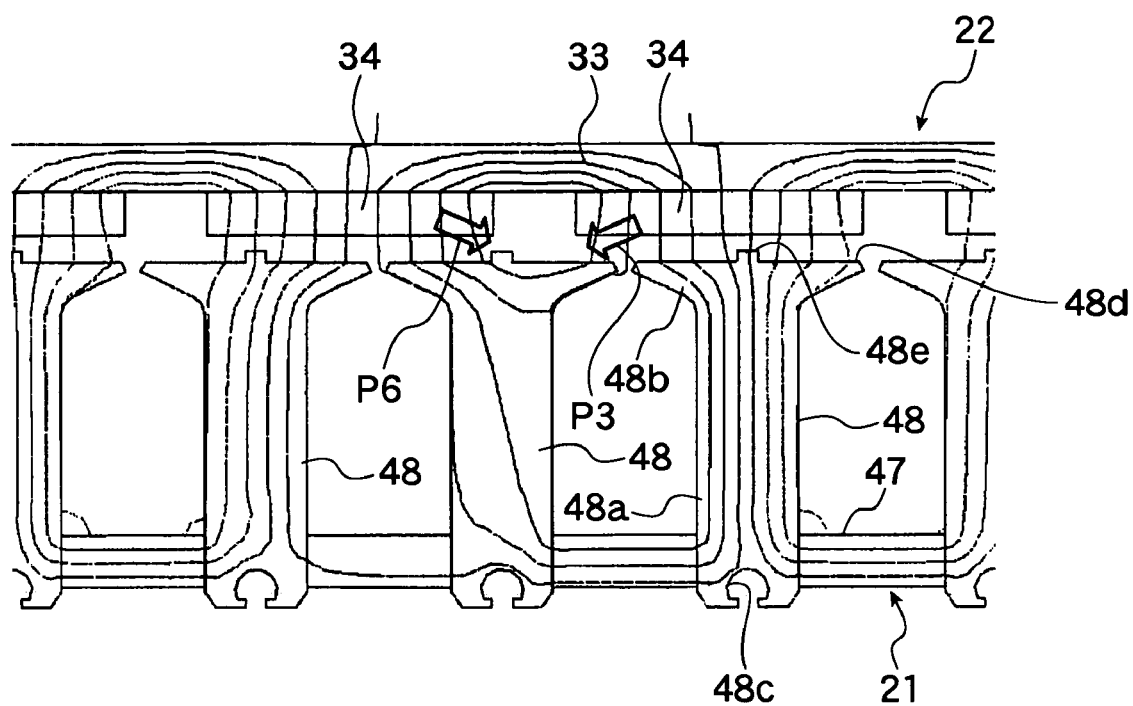
FIG. 16C is a type according to the second embodiment of the present invention provided with a protruded portion having a height equal to that of FIG. 10B and width narrower than that of FIG. 10B.

That is, FIGS. 16A, 16B and 16C are views corresponding to FIG. 12 and showing teeth 2 and 48 on the inner periphery sides thereof. FIG. 16A shows a function of a conventional structure of the teeth 2, FIG. 16B shows a function of the structure of the teeth 48 having a lower height on the inner periphery side as shown in FIG. 14, and FIG. 16C shows a function of the structure of the teeth 48 having a narrower width on the inner periphery side as shown in FIG. 15. Further, the outer periphery sides thereof are substantially the same as those of FIG. 10.

With the structure of FIG. 16A showing the conventional one, the cogging torque is generated by the generation of the suction force P3. In this conventional structure, since the interval "a" between the adjacent magnets 34 and the interval "b" between the adjacent teeth 48 are shorter than those shown in FIG. 10A, the suction force P3 is smaller than the suction force P1, and accordingly, it is necessary to make small the suction forces P5 and P6 for negating the cogging torque.

In consideration of the above fact, with the structure of FIG. 16B, the protruded portion 48e has the width equal to that of the protruded portion 48e of FIG. 10B, but has a height smaller than that of FIG. 10B. Further, with the structure of FIG. 16C, the protruded portion 48e has the same height as that of FIG. 10B, but has a width narrower than that of FIG. 10B. However, it may be of course possible to change both the width and height.

Figure 17:
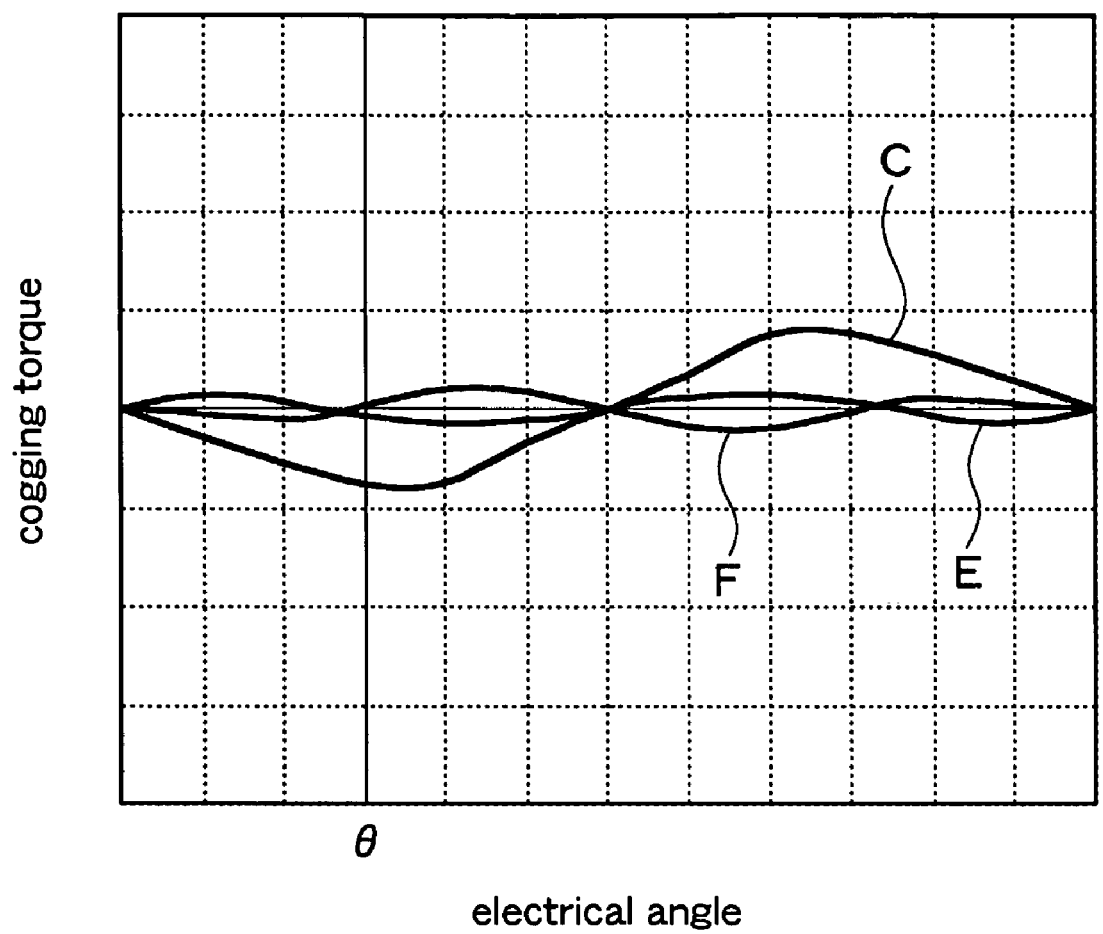
FIG. 17 is a graph showing relationship between cogging torque and electrical angle in connection with the types represented by FIGS. 16A, 16B and 16C, respectively.

Then, according to the structure of FIG. 16A, the cogging torque is generated, and in FIG. 17, the characteristic line C of the cogging torque has protruded and recessed portions. On the other hand, according to the structures of FIGS. 16B and 16C, the cogging torque is suppressed from generating, and the characteristic lines E and F of the cogging torque have protruded and recessed portions smaller in their sizes.

Therefore, as mentioned above, the shapes of the protruded portions 48e are made not to be constant and adjusted in conformity with the unequal slot opening, thereby effectively negating the cogging torque.

Accordingly, since the shape of the protruded portion 48e is not constant along the entire length direction, the tooth may be formed by laminating the steel plates 57 having different shapes, but the tooth may be formed by laminating the steel plates 57 having the same shape and thereafter, i.e., after the molding, the protruded portion 48e may be processed to be a desirable shape.

The other structures and functions are substantially the same as those mentioned with reference to the first embodiment, so that the duplicated explanations will be omitted herein.

[Third Embodiment]

Figure 18:
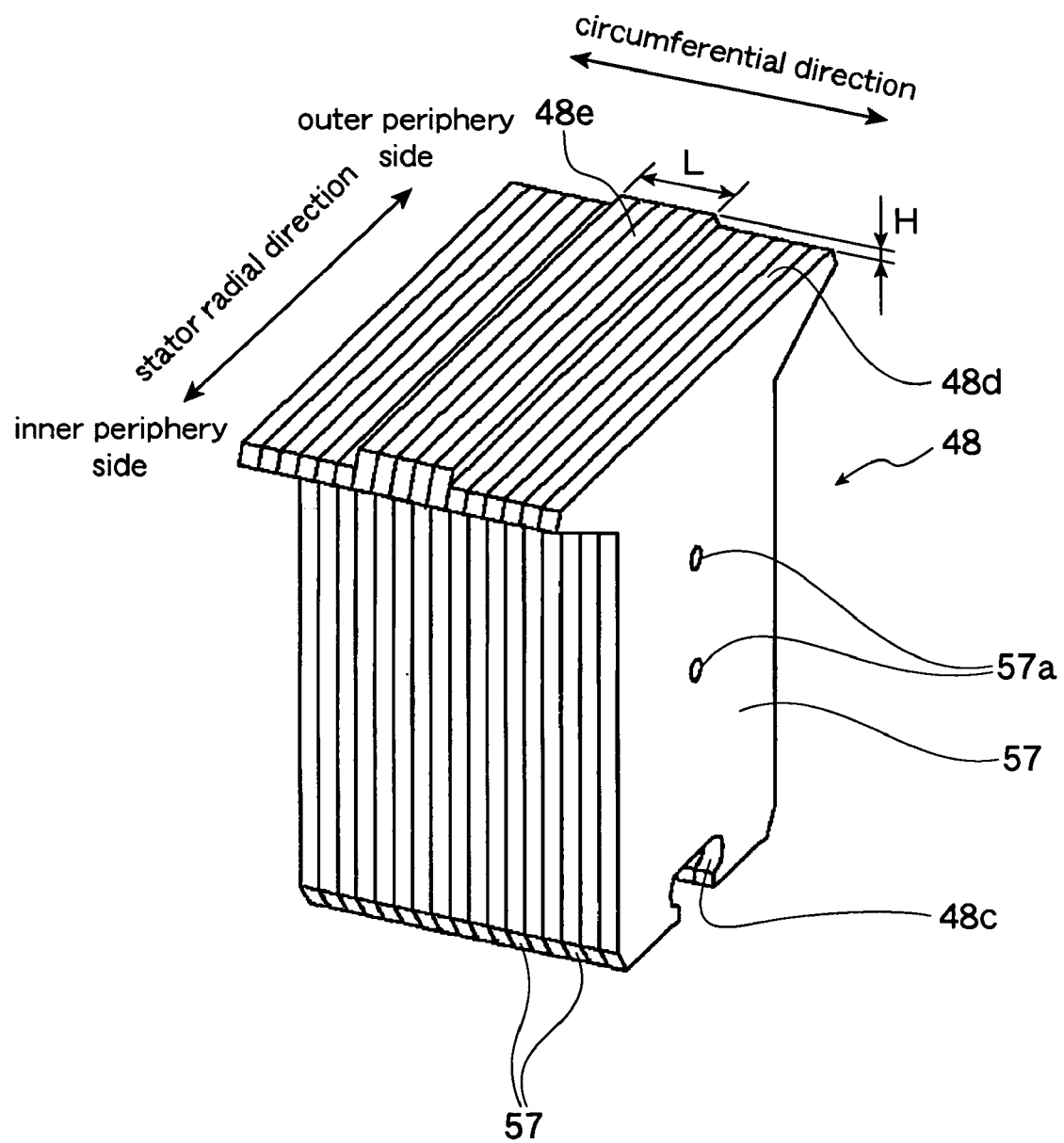
FIG. 18 is a perspective view representing a tooth according to a third embodiment of the present invention.
Figure 19:
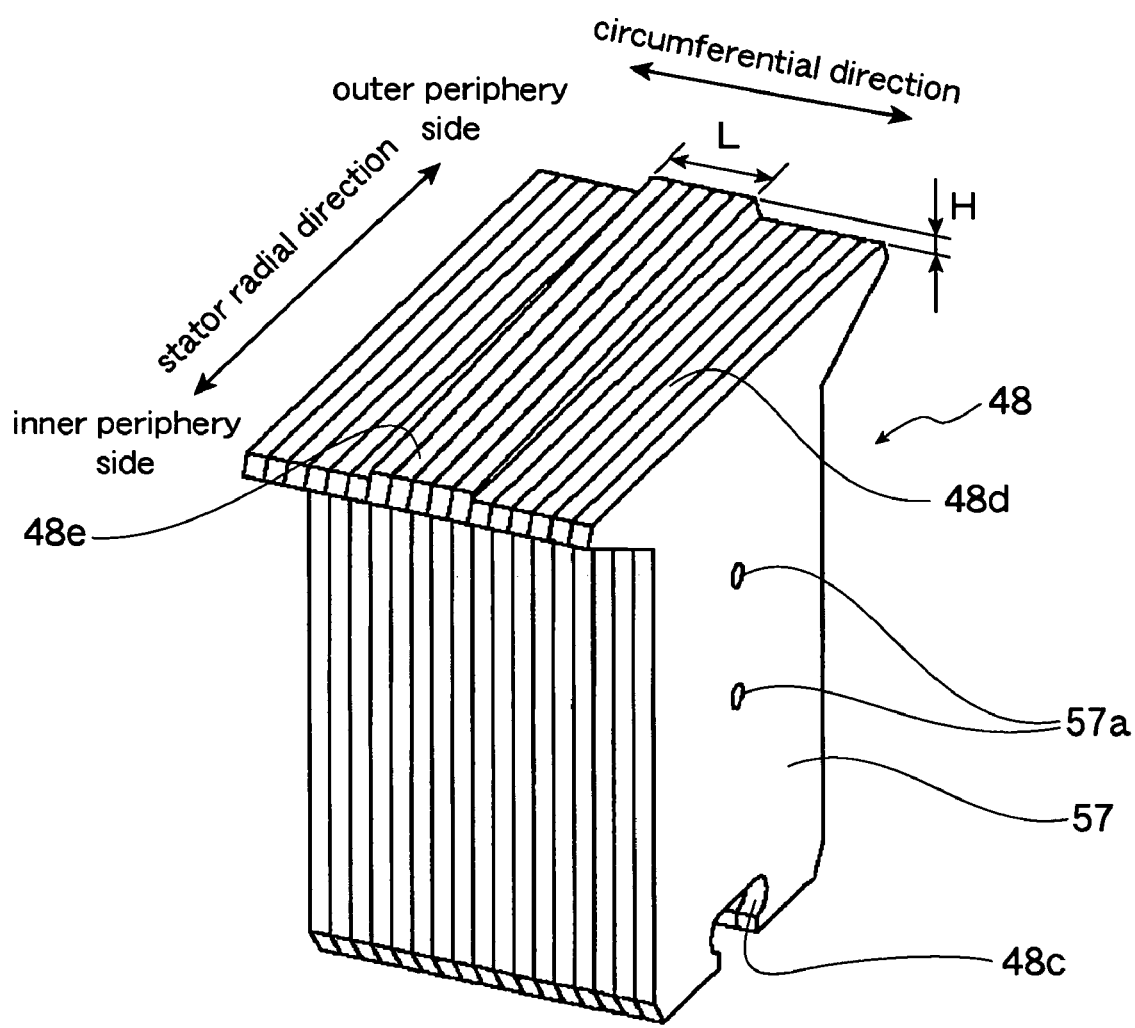
FIG. 19 is a perspective view showing another example of a tooth according to the third embodiment.
Figure 20:
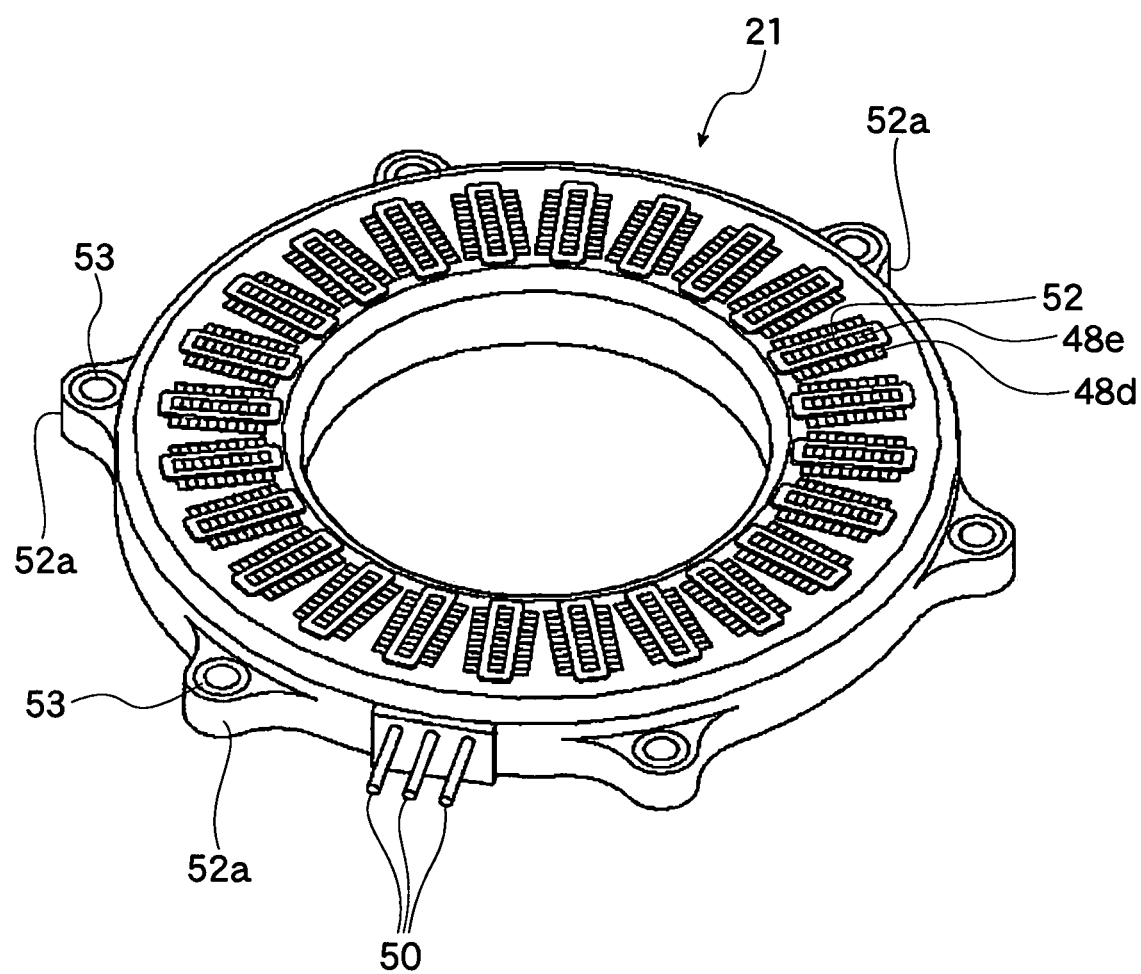
FIG. 20 is a perspective view showing a modification of the third embodiment corresponding to that of FIG. 5.
Figure 21:
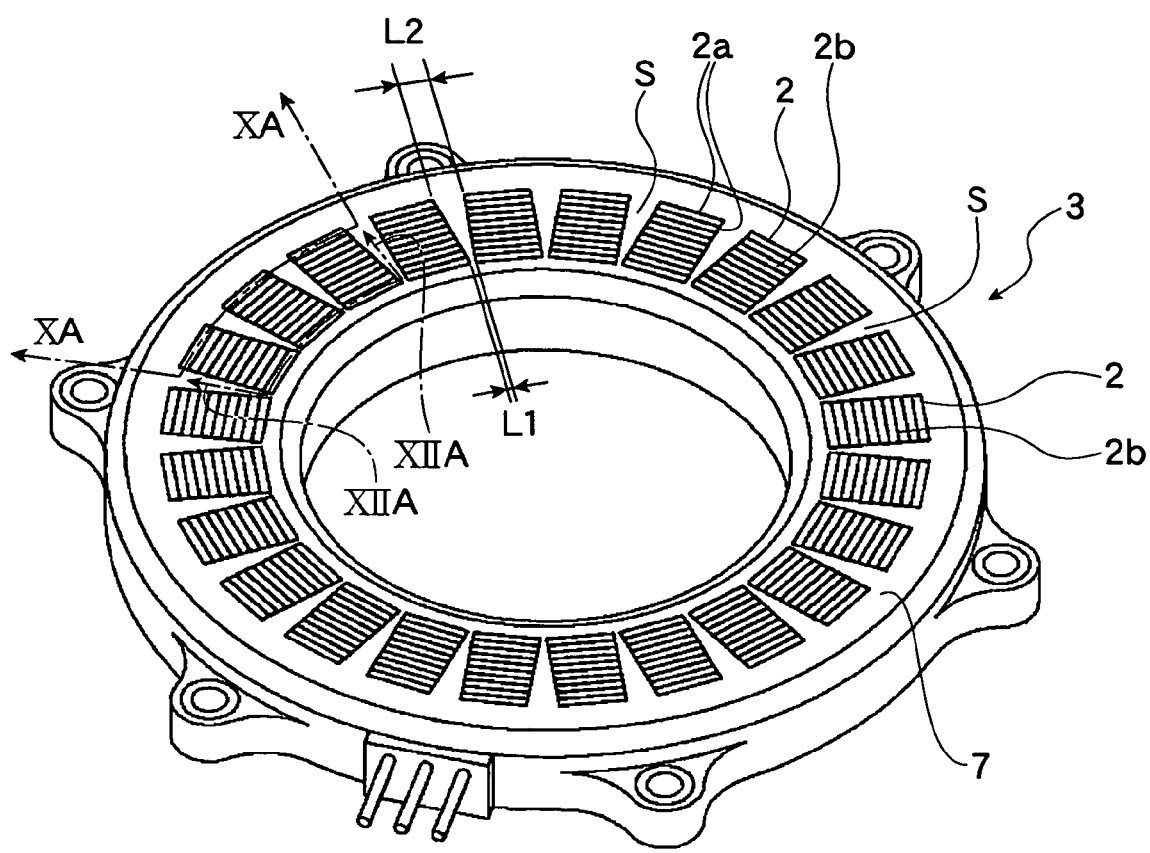
FIG. 21 is a perspective view of a stator of a conventional structure.

FIGS. 18 and 19 represent the third embodiment of the present invention.

In the structure shown in FIG. 18, the steel plates 57 are laminated in the circumferential direction, not radial direction, and a protruded portion 48e has constant height H and width L, and in the structure shown in FIG. 19, a protruded portion 48e has a constant width L and height H which is gradually made higher toward the outer periphery side.

The other structures and functions are substantially the same as those mentioned with reference to the first embodiment, so that the duplicated explanations will be omitted herein.

It is to be noted that the present invention is not limited to the described embodiments and many other changes and modifications may be made without departing from the scopes of the appended claims.

For example, although, in the described embodiments, the opposing surfaces 48d of the teeth 48 other than the protruded portions 48e thereof are entirely covered with the molding resin 52, the portions of the opposing surfaces 48d other than the protruded portions 48e may be partially covered with the molding resin 52.

What is claimed is:

1. A rotary electric machine comprising:
a stator including a plurality of teeth, a coil wound around each of the plurality of teeth, and a stator yoke core connecting the respective teeth; and
a rotor provided with a plurality of magnets disposed so as to face the teeth, respectively, the teeth and the magnets separated from each other by a space therebetween,
wherein each of the teeth has a surface that faces the magnets of the rotor, the surface comprising a protruded portion that protrudes above planar portions of the surface on both sides of the protruded portion, the protruded portion extending along a central region of the surface in a circumferential direction of the stator wherein the protruded portion has a height above said planar portions that differs in a radial direction of the protruded portion.

2. A rotary electric machine comprising:
a stator including a plurality of teeth, a coil wound around each of the plurality of teeth, and a stator yoke core connecting the respective teeth; and
a rotor provided with a plurality of magnets disposed so as to face the teeth, respectively, the teeth and the magnets separated from each other by a space therebetween,
wherein each of the teeth has a surface that faces the magnets of the rotor in an assembled rotary electric machine, the surface of the tooth facing the magnet through a gap in a rotational axis direction, the surface comprising a protruded portion that protrudes above planar portions that face the magnets and extend continuously from opposite sides of the protruded portion to opposite edges of the surface, the protruded portion extending along a central region of the surface in a circumferential direction of the stator, the protruded portion having a circumferential width which differs in a radial direction thereof.

3. The rotary electric machine according to claim 2, wherein each of the teeth is formed by laminating a plurality of steel plates having the same shape in a radial direction of the teeth.

4. The rotary electric machine according to claim 3, wherein the respective steel plates are fitted together by fitting a protrusion formed on one steel plate into a recess formed on an adjacent steel plate.

5. The rotary electric machine according to claim 4, wherein each of the teeth is formed by laminating a plurality of steel plates in a circumferential direction of the teeth.

6. The rotary electric machine according to claim 2, wherein the magnet is divided into a plurality of sections each having a square shape.

7. The rotary electric machine according to claim 2, wherein the protruded portion comprises a surface generally parallel to the planar portions.

8. A rotary electric machine comprising:
a stator including a plurality of teeth, a coil wound around each of the plurality of teeth, and a stator yoke core connecting the respective teeth; and
a rotor provided with a plurality of magnets disposed so as to face the teeth, respectively, the teeth and the magnets separated from each other by a space therebetween,
wherein each of the teeth has a surface that faces the magnets of the rotor in an assembled rotary electric machine, the surface of the tooth facing the magnet through a gap in a rotational axis direction, the surface comprising a protruded portion that protrudes above planar portions that face the magnets and extend continuously from opposite sides of the protruded portion to opposite edges of the surface, the protruded portion extending along a central region of the surface in a circumferential direction of the stator, the protruded portion having a height above said planar portions that differs in a radial direction of the protruded portion.

9. The rotary electric machine according to claim 8, wherein each of the teeth is formed by laminating a plurality of steel plates having the same shape in a radial direction of the teeth.

10. The rotary electric machine according to claim 9, wherein the respective steel plates are fitted together by fitting a protrusion formed on one steel plate into a recess formed on an adjacent steel plate.

11. The rotary electric machine according to claim 8, wherein each of the teeth is formed by laminating a plurality of steel plates in a circumferential direction of the teeth.

12. The rotary electric machine according to claim 8, wherein the magnet is divided into a plurality of sections, each having a square shape.

13. The rotary electric machine according to claim 8, wherein the protruded portion comprises a surface generally parallel to the planar portions.

* * * * *

UNITED STATES PATENT AND TRADEMARK OFFICE
CERTIFICATE OF CORRECTION

PATENT NO. : 7,592,733 B2
APPLICATION NO. : 11/489699
DATED : September 22, 2009
INVENTOR(S) : Naitou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this

Fourteenth Day of December, 2010

David J. Kappos
*Director of the United States Patent and Trademark Office*